United States Patent
Dam et al.

(10) Patent No.: US 12,305,578 B2
(45) Date of Patent: May 20, 2025

(54) IGNITION SYSTEM FOR POWER GENERATION ENGINE

(71) Applicant: Woodward, Inc., Fort Collins, CO (US)

(72) Inventors: Bidhan Dam, Zeeland, MI (US); Logan Oonk, Zeeland, MI (US); Dan Huber, Zeeland, MI (US); Vinay Prasad, Zeeland, MI (US); Sudipa Sarker, Zeeland, MI (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/304,584

(22) Filed: Jun. 23, 2021

(65) Prior Publication Data
US 2021/0396182 A1    Dec. 23, 2021

Related U.S. Application Data

(60) Provisional application No. 63/042,962, filed on Jun. 23, 2020.

(51) Int. Cl.
*F02C 7/264* (2006.01)
*F02C 7/22* (2006.01)
*F02C 9/26* (2006.01)

(52) U.S. Cl.
CPC ............... *F02C 7/264* (2013.01); *F02C 7/22* (2013.01); *F02C 9/26* (2013.01); *F05D 2220/32* (2013.01); *F05D 2240/35* (2013.01); *F05D 2270/301* (2013.01); *F05D 2270/303* (2013.01)

(58) Field of Classification Search
None
See application file for complete search history.

(56) References Cited

U.S. PATENT DOCUMENTS

| 856,790 | A | 12/1907 | Gutter |
| 2,760,340 | A | 8/1956 | Seglem |
| 2,847,826 | A | 8/1958 | Howes |
| 2,864,234 | A | 12/1958 | Seglem et al. |
| 2,967,224 | A | 1/1961 | Irwin |
| 2,974,485 | A | 3/1961 | Schiefer |

(Continued)

FOREIGN PATENT DOCUMENTS

| CN | 1598406 | 3/2005 |
| CN | 102192504 | 9/2011 |

(Continued)

OTHER PUBLICATIONS

CN Office Action in Chinese Appln. No. 201580055696, dated Mar. 2, 2020, 10 pages with English Translation.

(Continued)

*Primary Examiner* — Gerald L Sung
*Assistant Examiner* — Jacek Lisowski
(74) *Attorney, Agent, or Firm* — Reinhart Boerner Van Deuren P.C.

(57) ABSTRACT

The subject matter of this specification can be embodied in, among other things, a method that includes igniting an igniter stage configured to ignite combustion in a turbine combustor assembly, receiving pressure signals from a pressure sensor configured to sense pressure in the turbine combustor assembly, and controlling operation of the igniter stage based on the received pressure signals.

14 Claims, 19 Drawing Sheets

(56) References Cited

U.S. PATENT DOCUMENTS

| | | |
|---|---|---|
| 3,297,914 A | 1/1967 | Saintsbury |
| 3,954,389 A | 5/1976 | Szetela |
| 4,023,351 A | 5/1977 | Beyler |
| 4,141,213 A | 2/1979 | Ross |
| 4,215,979 A | 8/1980 | Morishita |
| 4,246,757 A | 1/1981 | Heberling |
| 4,301,656 A | 11/1981 | Stettler |
| 4,604,104 A | 8/1986 | Adis |
| 4,860,533 A | 8/1989 | Joshi |
| 4,896,510 A | 1/1990 | Foltz |
| 4,912,931 A | 4/1990 | Joshi |
| 4,928,481 A | 5/1990 | Joshi |
| 5,085,040 A | 2/1992 | Tilston |
| 5,444,982 A | 8/1995 | Heberling et al. |
| 5,491,972 A | 2/1996 | Bretz et al. |
| 5,540,056 A | 7/1996 | Heberling et al. |
| 5,584,684 A | 12/1996 | Dobbeling |
| 5,590,517 A | 1/1997 | DeFreitas |
| 5,636,511 A | 6/1997 | Pfefferle |
| 5,675,971 A | 10/1997 | Angel et al. |
| 5,680,766 A | 10/1997 | Joshi et al. |
| 5,778,676 A | 7/1998 | Joshi et al. |
| 6,182,436 B1 | 2/2001 | Prociw et al. |
| 6,339,923 B1 | 1/2002 | Halila et al. |
| 6,442,943 B1 * | 9/2002 | Harrison .............. F02C 9/00 60/803 |
| 6,530,223 B1 | 3/2003 | Dodds et al. |
| 6,912,857 B2 | 7/2005 | Schmotolocha et al. |
| 6,983,605 B1 | 1/2006 | Hook et al. |
| 7,299,620 B2 | 11/2007 | Stuttaford et al. |
| 7,913,494 B2 | 3/2011 | Hiromitus et al. |
| 8,161,725 B2 | 4/2012 | Yu |
| 8,312,854 B2 | 11/2012 | Weinrotter et al. |
| 8,459,222 B2 | 6/2013 | Weinrotter et al. |
| 8,584,648 B2 | 11/2013 | Chiera et al. |
| 8,650,880 B1 * | 2/2014 | Jansen .............. F23R 3/28 60/725 |
| 8,707,921 B2 | 4/2014 | Ridderbusch |
| 8,726,631 B2 | 5/2014 | Rudrapatna et al. |
| 8,807,107 B2 | 8/2014 | Weinrotter et al. |
| 8,844,491 B2 | 9/2014 | Weinrotter et al. |
| 9,010,292 B2 | 4/2015 | Herden |
| 9,080,772 B2 | 7/2015 | Prociw et al. |
| 9,133,813 B2 | 9/2015 | Kraus et al. |
| 9,200,563 B2 | 12/2015 | Thomassin |
| 9,212,823 B2 | 12/2015 | Boardman |
| 9,482,433 B2 | 11/2016 | Lee et al. |
| 10,408,454 B2 | 9/2019 | Lee et al. |
| 10,584,639 B2 | 3/2020 | Dam et al. |
| 10,704,469 B2 | 7/2020 | Dam et al. |
| 10,711,699 B2 | 7/2020 | Dam et al. |
| 11,421,601 B2 | 8/2022 | Dam et al. |
| 2001/0050069 A1 | 12/2001 | Oprea et al. |
| 2002/0002962 A1 | 1/2002 | Ibrahim |
| 2002/0011232 A1 | 1/2002 | Gillis et al. |
| 2002/0026926 A1 | 3/2002 | Loye et al. |
| 2002/0032114 A1 | 3/2002 | Yi et al. |
| 2002/0134345 A1 | 9/2002 | Adams |
| 2002/0134767 A1 | 9/2002 | Brunet et al. |
| 2002/0157559 A1 | 10/2002 | Brunet et al. |
| 2003/0005908 A1 | 1/2003 | Fujieda et al. |
| 2003/0054310 A1 | 3/2003 | Rigazzi |
| 2003/0056749 A1 | 3/2003 | Beckertgis |
| 2003/0062021 A1 | 4/2003 | Najt et al. |
| 2003/0075121 A1 | 4/2003 | Dixon |
| 2003/0110758 A1 | 6/2003 | Adams |
| 2003/0116121 A1 | 6/2003 | Agama et al. |
| 2003/0183192 A1 | 10/2003 | Donauer et al. |
| 2003/0213461 A1 | 11/2003 | Regueiro |
| 2004/0045514 A1 | 3/2004 | Qian et al. |
| 2004/0065293 A1 | 4/2004 | Goto |
| 2004/0107941 A1 | 6/2004 | Goto |
| 2004/0123849 A1 | 7/2004 | Bryant |
| 2004/0144357 A1 | 7/2004 | Adams |
| 2004/0149254 A1 | 8/2004 | Piock |
| 2004/0194753 A1 | 10/2004 | Weickel et al. |
| 2004/0211389 A1 | 10/2004 | DeLisle |
| 2004/0216712 A1 | 11/2004 | Herdin et al. |
| 2004/0226523 A1 | 11/2004 | Kreuter et al. |
| 2004/0237928 A1 | 12/2004 | Sun et al. |
| 2004/0261760 A1 | 12/2004 | Robinet |
| 2005/0000484 A1 | 1/2005 | Schultz et al. |
| 2005/0016495 A1 | 1/2005 | Lampard |
| 2005/0029021 A1 | 2/2005 | Rigazzi |
| 2005/0045600 A1 | 3/2005 | Tatham |
| 2005/0051130 A1 | 3/2005 | Lampard |
| 2005/0087168 A1 | 4/2005 | Hwang |
| 2005/0092285 A1 | 5/2005 | Klonis et al. |
| 2005/0098162 A1 | 5/2005 | Bryant |
| 2005/0103306 A1 | 5/2005 | Izumisawa |
| 2005/0115547 A1 | 6/2005 | Bryant |
| 2005/0126177 A1 | 6/2005 | Primlani |
| 2005/0163696 A1 | 7/2005 | Uhm et al. |
| 2005/0172631 A1 | 8/2005 | Primlani |
| 2005/0172929 A1 | 8/2005 | Strauss |
| 2005/0193987 A1 | 9/2005 | Doering |
| 2005/0205353 A1 | 9/2005 | Chen |
| 2005/0211217 A1 | 9/2005 | Boley et al. |
| 2005/0217616 A1 | 10/2005 | Po |
| 2005/0217637 A1 | 10/2005 | Hill et al. |
| 2005/0224038 A1 | 10/2005 | Bando |
| 2005/0224605 A1 | 10/2005 | Dingle |
| 2005/0224606 A1 | 10/2005 | Dingle et al. |
| 2005/0230854 A1 | 10/2005 | DeLisle |
| 2005/0274334 A1 | 12/2005 | Warren |
| 2005/0279321 A1 | 12/2005 | Crawford et al. |
| 2005/0284442 A1 | 12/2005 | Stuttaford et al. |
| 2006/0053791 A1 | 3/2006 | Prentice |
| 2006/0096570 A1 | 5/2006 | Tourteaux et al. |
| 2006/0096571 A1 | 5/2006 | Tourteaux et al. |
| 2006/0144362 A1 | 7/2006 | Robinet et al. |
| 2006/0169241 A1 | 8/2006 | Merritt |
| 2006/0219210 A1 | 10/2006 | Bailey et al. |
| 2006/0225692 A1 | 10/2006 | Lindner et al. |
| 2006/0225693 A1 | 10/2006 | Brachert et al. |
| 2006/0260580 A1 | 11/2006 | Yoshimoto |
| 2006/0260581 A1 | 11/2006 | Yoshimoto |
| 2006/0266325 A1 | 11/2006 | Sergeev |
| 2006/0267469 A1 | 11/2006 | Alger, II et al. |
| 2007/0000465 A1 | 1/2007 | Scarisbrick et al. |
| 2007/0007257 A1 | 1/2007 | Uhm et al. |
| 2007/0023002 A1 | 2/2007 | Alger, II et al. |
| 2007/0044449 A1 | 3/2007 | O'Brien et al. |
| 2007/0051338 A1 | 3/2007 | Merritt |
| 2007/0068466 A1 | 3/2007 | Kulzer |
| 2007/0068475 A1 | 3/2007 | Kopecek et al. |
| 2007/0105928 A1 | 5/2007 | Blasco et al. |
| 2007/0144459 A1 | 6/2007 | Fiveland |
| 2007/0144480 A1 | 6/2007 | Herweg et al. |
| 2007/0235002 A1 | 10/2007 | Blank |
| 2007/0261663 A1 | 11/2007 | Lineton et al. |
| 2007/0272200 A1 | 11/2007 | Kamimura et al. |
| 2008/0017165 A1 | 1/2008 | Schubert |
| 2008/0035105 A1 | 2/2008 | Robinson |
| 2008/0098983 A1 | 5/2008 | Bailey |
| 2008/0168963 A1 | 7/2008 | Gagliano et al. |
| 2008/0196690 A1 | 8/2008 | Hotta et al. |
| 2008/0253738 A1 | 10/2008 | Yamauchi et al. |
| 2008/0272683 A1 | 11/2008 | Boehler et al. |
| 2008/0296294 A1 | 12/2008 | Uhm |
| 2008/0299504 A1 | 12/2008 | Horn |
| 2009/0025673 A1 | 1/2009 | Adams |
| 2009/0077972 A1 | 3/2009 | Singh |
| 2009/0078228 A1 | 3/2009 | Tsutsumizaki et al. |
| 2010/0000486 A1 | 1/2010 | Herden et al. |
| 2010/0051724 A1 | 3/2010 | Hicks et al. |
| 2010/0051726 A1 | 3/2010 | Houtman et al. |
| 2010/0065000 A1 | 3/2010 | Herden et al. |
| 2010/0071343 A1 | 3/2010 | Yu |
| 2010/0096037 A1 | 4/2010 | Lee et al. |
| 2010/0126472 A1 | 5/2010 | Shepherd |
| 2010/0132660 A1 | 6/2010 | Nerheim |
| 2010/0147259 A1 | 6/2010 | Kuhnert et al. |
| 2010/0252546 A1 | 10/2010 | Herden et al. |

(56) References Cited

U.S. PATENT DOCUMENTS

| | | | |
|---|---|---|---|
| 2010/0275868 A1 | 11/2010 | Herden et al. | |
| 2010/0282195 A1 | 11/2010 | Herden et al. | |
| 2010/0282196 A1 | 11/2010 | Ridderbusch | |
| 2010/0293957 A1 | 11/2010 | Chen | |
| 2010/0296530 A1 | 11/2010 | Herden et al. | |
| 2011/0036324 A1 | 2/2011 | de Versterre | |
| 2011/0041793 A1 | 2/2011 | Weinrotter et al. | |
| 2011/0061623 A1 | 3/2011 | Oledzki | |
| 2011/0100322 A1 | 5/2011 | Gruber et al. | |
| 2011/0146618 A1 | 6/2011 | LaPointe et al. | |
| 2011/0297121 A1 | 12/2011 | Kraus et al. | |
| 2011/0303185 A1 | 12/2011 | Zajac et al. | |
| 2011/0303186 A1 | 12/2011 | Sergeev | |
| 2012/0024250 A1 | 2/2012 | Weyl et al. | |
| 2012/0060791 A1 | 3/2012 | Woerner et al. | |
| 2012/0103302 A1 | 5/2012 | Attard | |
| 2012/0111014 A1 | 5/2012 | Beran | |
| 2012/0210974 A1 | 8/2012 | Adams | |
| 2012/0304959 A1 | 12/2012 | Weinrotter et al. | |
| 2013/0000597 A1 | 1/2013 | Weinrotter et al. | |
| 2013/0298563 A1 | 11/2013 | Haynes et al. | |
| 2014/0013761 A1 | 1/2014 | Pasqualotto | |
| 2014/0060063 A1 | 3/2014 | Boardman et al. | |
| 2014/0144142 A1 | 5/2014 | El-Nabi et al. | |
| 2014/0260294 A1* | 9/2014 | Farshchian | F23N 5/20 60/773 |
| 2014/0360456 A1 | 12/2014 | Gaul et al. | |
| 2014/0366551 A1 | 12/2014 | Prociw et al. | |
| 2015/0128607 A1 | 5/2015 | Lee | |
| 2015/0198097 A1* | 7/2015 | Aphale | F02C 9/00 700/287 |
| 2015/0211742 A1 | 7/2015 | Lee | |
| 2015/0240710 A1 | 8/2015 | Thomassin et al. | |
| 2015/0260131 A1 | 9/2015 | Riley et al. | |
| 2015/0260407 A1* | 9/2015 | Crothers | F23R 3/346 60/725 |
| 2015/0322863 A1* | 11/2015 | Burke | F23N 5/16 73/112.01 |
| 2016/0047318 A1 | 2/2016 | Dam et al. | |
| 2016/0102860 A1 | 4/2016 | Chandler et al. | |
| 2017/0089577 A1* | 3/2017 | DeSilva | F23Q 23/10 |
| 2019/0010872 A1 | 1/2019 | Dam et al. | |
| 2019/0010873 A1 | 1/2019 | Dam et al. | |
| 2020/0309378 A1 | 10/2020 | Dam et al. | |
| 2021/0404392 A1* | 12/2021 | Castellaw | F02C 7/232 |
| 2022/0136444 A1 | 5/2022 | Ryon et al. | |
| 2022/0136445 A1 | 5/2022 | Ryon et al. | |
| 2022/0136696 A1 | 5/2022 | Ryon et al. | |
| 2022/0186669 A1 | 6/2022 | Ryon et al. | |
| 2022/0195937 A1 | 6/2022 | Ryon et al. | |
| 2022/0364516 A1 | 11/2022 | Dam et al. | |
| 2022/0412561 A1 | 12/2022 | Ryon et al. | |
| 2023/0060569 A1 | 3/2023 | Ryon et al. | |
| 2023/0068242 A1 | 3/2023 | Ryon et al. | |
| 2023/0114830 A1 | 4/2023 | Ryon et al. | |
| 2023/0193828 A1 | 6/2023 | Ryon et al. | |
| 2023/0265798 A1 | 8/2023 | Dam et al. | |
| 2023/0323811 A1 | 10/2023 | Ryon et al. | |
| 2023/0392552 A1 | 12/2023 | Ryon et al. | |

FOREIGN PATENT DOCUMENTS

| | | |
|---|---|---|
| CN | 102563697 | 7/2012 |
| CN | 103459928 | 12/2013 |
| CN | 104061599 | 9/2014 |
| CN | 106796031 | 5/2017 |
| DE | 1096684 | 1/1961 |
| DE | 1275837 | 8/1968 |
| DE | 2839280 | 3/1980 |
| EP | 0120174 | 10/1984 |
| EP | 861369 | 4/2002 |
| EP | 1618363 | 1/2006 |
| EP | 1701017 | 9/2006 |
| EP | 1671019 A4 | 1/2009 |
| EP | 1671018 A4 | 2/2009 |
| EP | 1456530 B1 | 4/2009 |
| EP | 1766208 A4 | 8/2011 |
| EP | 2379859 | 10/2011 |
| EP | 1671018 B1 | 1/2012 |
| EP | 2414660 | 2/2012 |
| EP | 2510222 | 10/2012 |
| EP | 2558709 | 2/2013 |
| EP | 2561214 | 2/2013 |
| EP | 2577042 | 4/2013 |
| EP | 2775117 | 11/2014 |
| EP | 2836690 | 2/2015 |
| EP | 2778367 | 3/2015 |
| EP | 2444621 B1 | 6/2015 |
| EP | 2884174 | 6/2015 |
| EP | 2775125 | 8/2015 |
| EP | 2943666 | 11/2015 |
| EP | 3078913 | 10/2016 |
| EP | 3438541 | 2/2019 |
| FR | 72883 | 7/1960 |
| GB | 618688 | 2/1949 |
| GB | 625335 | 6/1949 |
| GB | 628366 | 8/1949 |
| GB | 799898 | 8/1958 |
| GB | 856790 | 12/1960 |
| GB | 862148 | 3/1961 |
| KR | 101964989 | 4/2019 |
| WO | WO9830793 | 7/1998 |
| WO | WO2009040177 | 4/2009 |
| WO | WO2010094551 | 8/2010 |
| WO | WO2011085853 | 7/2011 |
| WO | WO2011138087 | 7/2012 |
| WO | WO2012152462 | 11/2012 |
| WO | WO2012152471 | 11/2012 |
| WO | WO2013041289 | 3/2013 |
| WO | WO2014204449 | 12/2014 |
| WO | WO2015142744 | 9/2015 |
| WO | WO2016025746 | 2/2016 |

OTHER PUBLICATIONS

CN Office Action in Chinese Appln. No. 201580055696, dated Nov. 11, 2019, 17 pages with English Translation.
CN Office Action in Chinese Appln. No. 201580055969, dated May 24, 2019, 9 pages with English Translation.
CN Office Action in Chinese Appln. No. 201580055969, dated Nov. 14, 2018, 22 pages with English Translation.
CN Office Action in Chinese Appln. No. 201880058112.9, dated Feb. 26, 2021, 21 pages with English Translation.
CN Office Action in Chinese Appln. No. 201880058182.4, dated Mar. 2, 2021, 15 pages with English Translation.
EP Communication Pursuant to Article 94(3) in European Appln. No. 15756520.1, dated Feb. 4, 2020, 4 pages.
PCT International Preliminary Report on Patentability in International Appln. No. PCT/US2015/045664, dated Feb. 21, 2017, 8 pages.
PCT International Preliminary Report on Patentability in International Appln. No. PCT/US2018/039971, dated Jan. 7, 2020, 8 pages.
PCT International Preliminary Report on Patentability in International Appln. No. PCT/US2018/040003, dated Jan. 16, 2020, 9 pages.
PCT International Preliminary Report on Patentability in International Appln. No. PCT/US2020/025191, dated Oct. 7, 2021, 7 pages.
PCT International Search Report and Written Opinion in International Application No. PCT/US2020/025191, dated Jun. 19, 2020, 14 pages.
PCT International Search Report and Written Opinion in International Appln. No. PCT/US2015/045664, dated Oct. 22, 2015, 11 pages.
PCT International Search Report and Written Opinion in International Appln. No. PCT/US2018/039971, dated Oct. 5, 2018, 15 pages.
PCT International Search Report and Written Opinion in International Appln. No. PCT/US2018/040003, dated Oct. 5, 2018, 16 pages.

(56) References Cited

OTHER PUBLICATIONS

PCT International Search Report and Written Opinion in International Appln. No. PCT/US2021/038687, dated Oct. 4, 2021, 23 pages.
CN Office Action in Chinese Appln. No. 202080039327, dated Oct. 20, 2022, 25 pages.
PCT International Preliminary Report on Patentability in International Appln. No. PCT/US2021/038687, mailed on Jan. 5, 2023, 9 pages.
CN Office Action in Chinese Appln. No. 202080039327, dated Apr. 26, 2023, 39 pages (with English Translation).
PCT International Search Report and Written Opinion in International Appln. No. PCT/US2023/013322, mailed on May 30, 2023, 14 pages.
Notice of Allowance in Chinese Application No. 202080039327.3, dated Aug. 23, 2023, 6 pages (with English Translation).
Communication Pursuant to Article 94(3) in European Application No. 21742632.9, dated Jun. 19, 2024, 8 pages.
International Preliminary Report on Patentability in International Application No. PCT/US2023/013322, mailed on Aug. 29, 2024, 7 pages.

\* cited by examiner

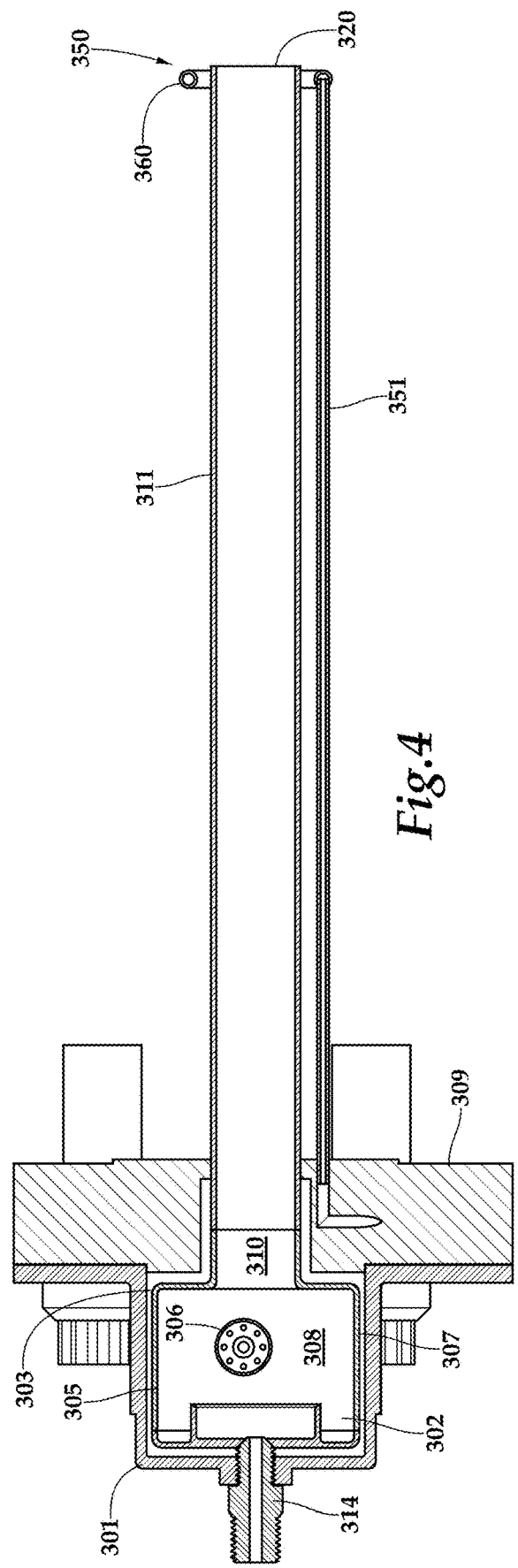

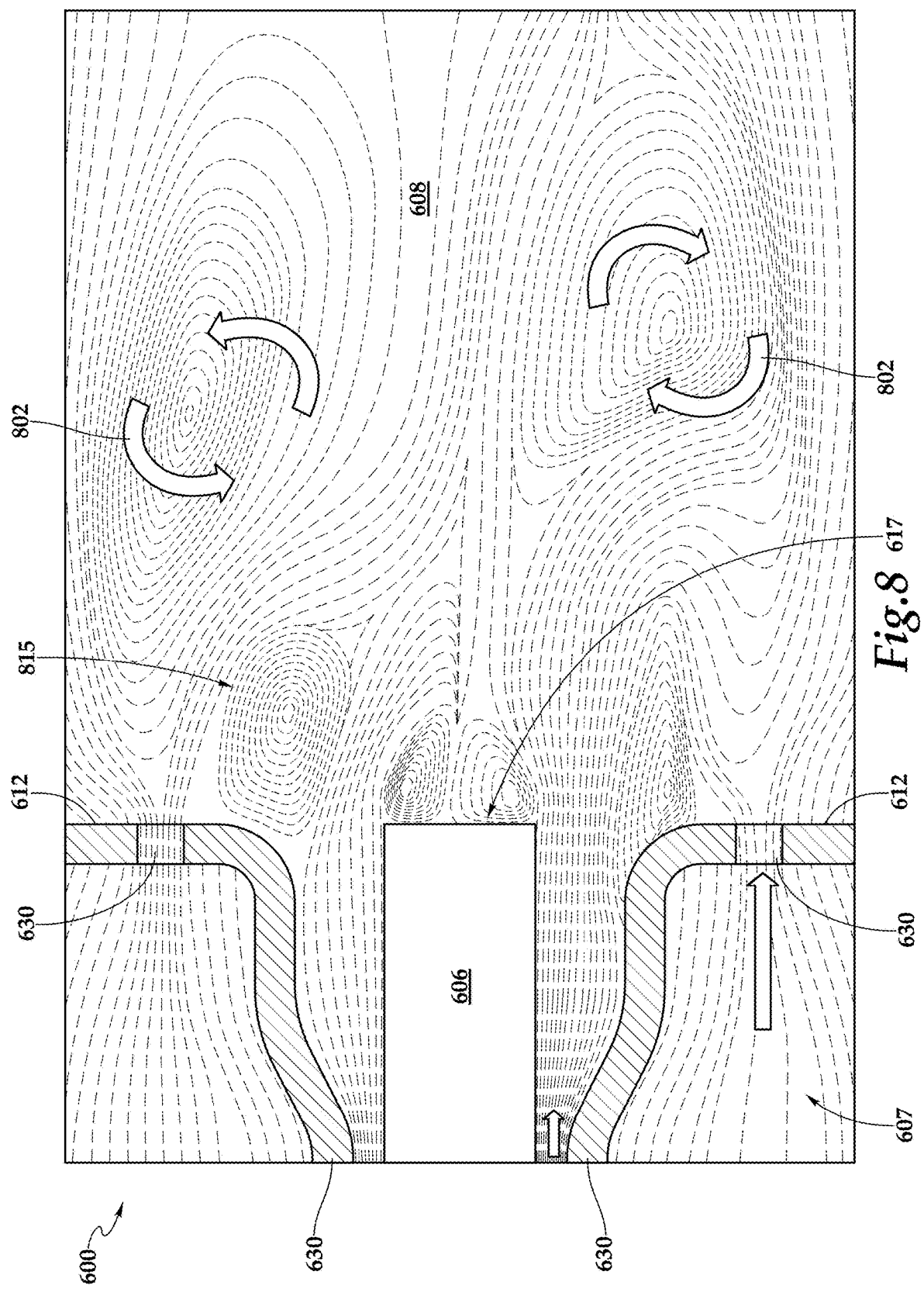

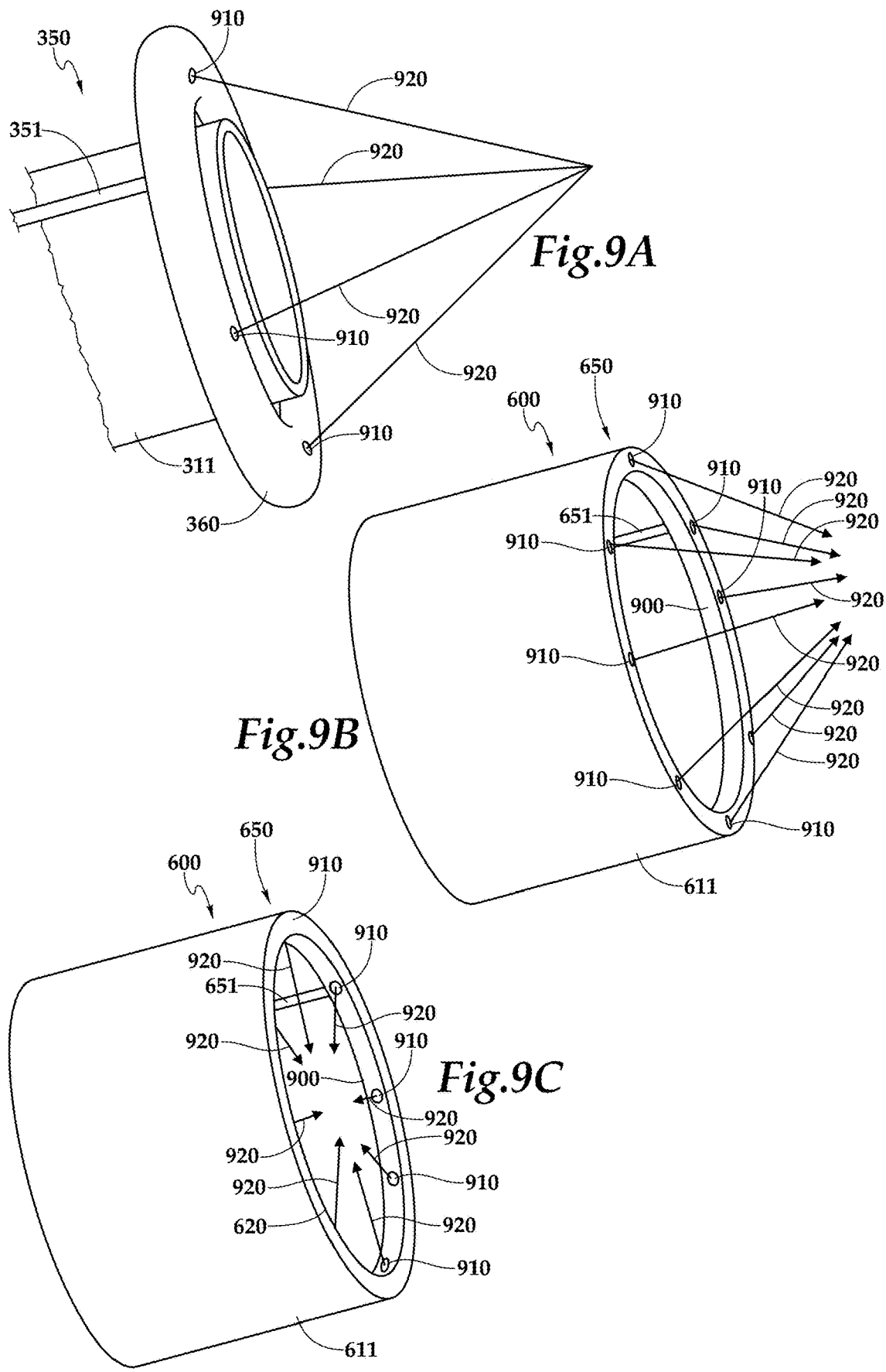

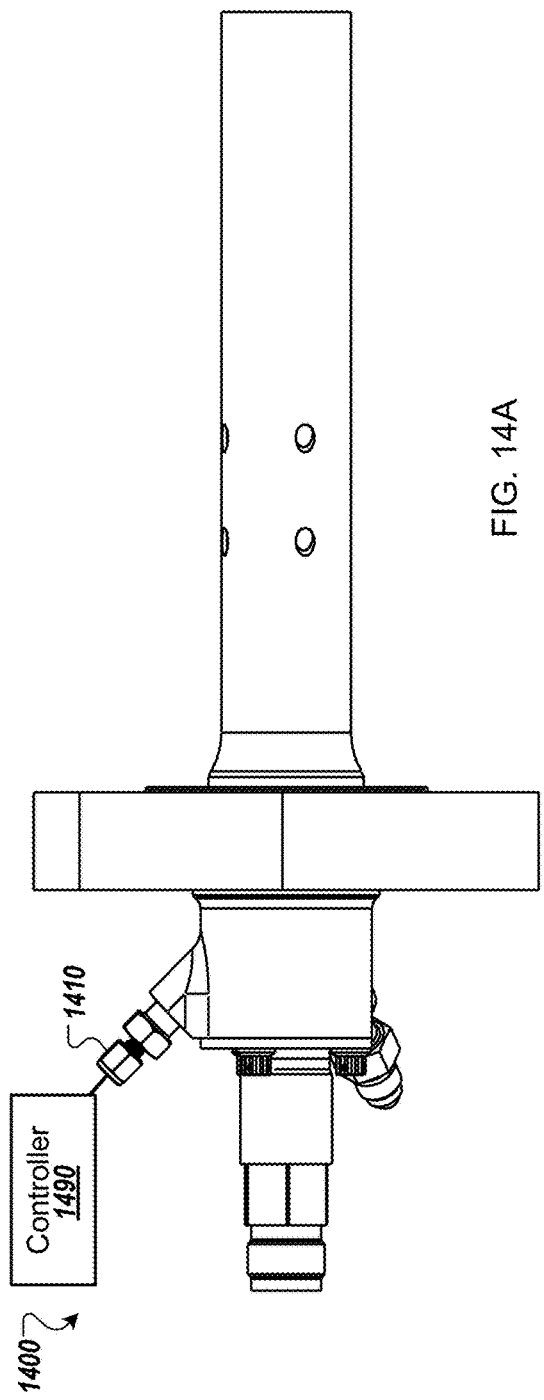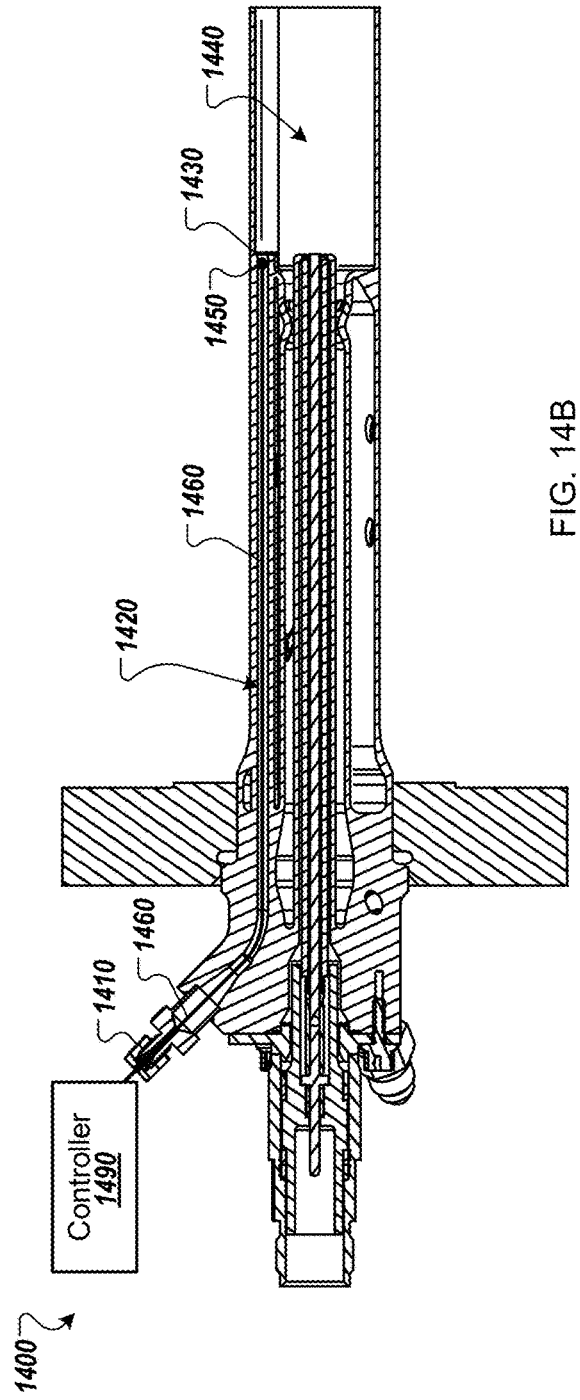

IGNITION SYSTEM FOR POWER GENERATION ENGINE

CROSS-REFERENCE TO RELATED PATENT APPLICATIONS

This application claims the benefit of priority to U.S. Provisional Application No. 63/042,962, filed Jun. 23, 2020, the contents of which are incorporated by reference herein.

TECHNICAL FIELD

This specification generally relates to combustor assemblies for turbine engines that incorporate ignition systems to facilitate ignition in a main combustion chamber.

BACKGROUND

The turbine engine is the preferred class of internal combustion engine for many high power applications. Fundamentally, the turbine engine features an upstream rotating compressor coupled to a downstream turbine, and a combustion chamber in-between. An igniter is a device that may be used to ignite fuel in the primary combustor of a turbine engine. In some applications, spark igniters are used to light the engine, however there are circumstances, such as at cold start and/or with heavy primary fuels, when spark igniters can struggle to light the engine.

SUMMARY

In general, this document describes combustor assemblies for turbine engines that incorporate ignition systems to facilitate ignition in a main combustion chamber.

In a general embodiment, a turbine combustor assembly includes a primary combustion chamber in fluid communication with a primary fuel injector and a primary air inlet, and an igniter carried by the primary combustion chamber, including an igniter stage including an auxiliary combustion chamber housing having a mixing chamber and a tubular throat converging downstream of the mixing chamber, and an ignition source projecting into the mixing chamber of the auxiliary combustion chamber, and a pressure sensor configured to sense pressure within the primary combustion chamber.

Various embodiments can include some, all, or none of the following features. The tubular throat can extend into the primary combustion chamber, and the mixing chamber can be arranged within the tubular throat downstream of the mixing chamber. The turbine combustor assembly can include a fluid conduit configured to fluidically connect the pressure sensor to the primary combustion chamber. The turbine combustor assembly can include a fluid conduit configured to fluidically connect the pressure sensor to the auxiliary combustion chamber. The turbine combustor assembly can include a controller configured to receive pressure signals from the pressure sensor. The controller can be further configured to determine ignition of fuel in the primary combustion chamber based on the received pressure signals. The controller can be further configured to determine an ignition failure in the primary combustion chamber, and initiate an ignition process based on the determined ignition failure. The controller can be further configured to control a fuel flow to the igniter based on the received pressure signals. The turbine combustor assembly can include a temperature sensor arranged within a temperature sensor conduit proximal the auxiliary combustion chamber and configured to a temperature of the auxiliary combustion chamber. The turbine combustor assembly can include a controller configured to receive temperature signals from the temperature sensor. The controller can be further configured to determine ignition of fuel in the primary combustion chamber based on the received temperature signals. The controller can be further configured to determine an ignition failure in the primary combustion chamber, and initiate an ignition process based on the determined ignition failure. The controller can be further configured to control a fuel flow to the igniter based on the received temperature signals.

In a general implementation, a method includes igniting an igniter stage configured to ignite combustion in a turbine combustor assembly, receiving pressure signals from a pressure sensor configured to sense pressure in the turbine combustor assembly, and controlling operation of the igniter stage based on the received pressure signals.

Various implementations can include some, all, or none of the following features. Igniting an igniter stage can include receiving fuel into an auxiliary combustion chamber of the igniter stage of the turbine combustor assembly, mixing air incoming into the auxiliary combustion chamber with the fuel to provide a first air and fuel mixture, and igniting the first air and fuel mixture in the auxiliary combustion chamber. The method can also include receiving additional fuel into an auxiliary fuel outlet manifold of a second igniter stage arranged proximal to an outlet of the auxiliary combustion chamber, providing, by the auxiliary fuel outlet manifold, additional igniter fuel to the ignited air and fuel mixture proximal the outlet, and igniting, by the ignited air and fuel mixture, the additional igniter fuel provided by the auxiliary fuel outlet manifold to provide a combusting air and fuel mixture. Igniting combustion in a turbine combustor assembly can include igniting a primary air and fuel mixture, in a primary combustion chamber of the turbine combustor assembly, with a combusting air and fuel mixture provided by the igniter stage. Controlling operation of the igniter stage based on the received pressure signals can include determining, based on the received pressure signals, an absence of combustion in the turbine combustor assembly, and re-igniting the igniter stage, based on the determining. The absence of combustion in the turbine combustor assembly can be an absence of combustion in a primary combustion chamber of the turbine combustor assembly. Controlling operation of the igniter stage based on the received pressure signals can include controlling a flow of fuel to the igniter stage based on the received pressure signals. The method can include reducing combustion dynamics of combustion in the turbine combustor assembly based on controlling operation of the igniter stage. The method can include reducing sound pressure levels of combustion in a primary combustion chamber of the turbine combustor assembly based on controlling operation of the igniter stage.

In another example implementation, a method includes igniting an igniter stage configured to ignite combustion in a turbine combustor assembly, receiving temperature signals from a temperature sensor configured to sense temperature in the turbine combustor assembly, and controlling operation of the igniter stage based on the received temperature signals.

Various implementations can include some, all, or none of the following features. Igniting an igniter stage can include receiving fuel into an auxiliary combustion chamber of the igniter stage of the turbine combustor assembly, mixing air incoming into the auxiliary combustion chamber with the fuel to provide a first air and fuel mixture, and igniting the first air and fuel mixture in the auxiliary combustion chamber. The method can also include receiving additional fuel into an auxiliary fuel outlet manifold of a second igniter stage arranged proximal to an outlet of the auxiliary combustion chamber, providing, by the auxiliary fuel outlet manifold, additional igniter fuel to the ignited air and fuel mixture proximal the outlet, and igniting, by the ignited air and fuel mixture, the additional igniter fuel provided by the auxiliary fuel outlet manifold to provide a combusting air and fuel mixture. Igniting combustion in a turbine combustor assembly can include igniting a primary air and fuel mixture, in a primary combustion chamber of the turbine combustor assembly, with a combusting air and fuel mixture provided by the igniter stage. Controlling operation of the igniter stage based on the received temperature signals can include determining, based on the received temperature signals, an absence of combustion in the turbine combustor assembly, and re-igniting the igniter stage, based on the determining. The absence of combustion in the turbine combustor assembly can be an absence of combustion in a primary combustion chamber of the turbine combustor assembly. Controlling operation of the igniter stage based on the received temperature signals can include controlling a flow of fuel to the igniter stage based on the received temperature signals.

In another example embodiment, a turbine combustor assembly includes a primary combustion chamber in fluid communication with a primary fuel injector and a primary air inlet, and an igniter carried by the primary combustion chamber, including an igniter stage including an auxiliary combustion chamber housing having a mixing chamber and a tubular throat converging downstream of the mixing chamber, and an ignition source projecting into the mixing chamber of the auxiliary combustion chamber, and a temperature sensor configured to sense temperature within the primary combustion chamber.

Various embodiments can include some, all, or none of the following features. The tubular throat can extend into the primary combustion chamber, and the mixing chamber can be arranged within the tubular throat downstream of the mixing chamber. The temperature sensor can be arranged within a temperature sensor conduit proximal the auxiliary combustion chamber and configured to a temperature of the auxiliary combustion chamber. The turbine combustor assembly can include a controller configured to receive temperature signals from the temperature sensor. The controller can be further configured to determine ignition of fuel in the primary combustion chamber based on the received temperature signals. The controller can be further configured to determine an ignition failure in the primary combustion chamber, and initiate an ignition process based on the determined ignition failure. The controller can be further configured to control a fuel flow to the igniter based on the received temperature signals. The turbine combustor assembly can include a pressure sensor configured to sense pressure within the primary combustion chamber. The turbine combustor assembly can include a fluid conduit configured to fluidically connect the pressure sensor to the primary combustion chamber. The turbine combustor assembly can include a fluid conduit configured to fluidically connect the pressure sensor to the auxiliary combustion chamber. The turbine combustor assembly can include a controller configured to receive pressure signals from the pressure sensor. The controller can be further configured to determine ignition of fuel in the primary combustion chamber based on the received pressure signals. The controller can be further configured to determine an ignition failure in the primary combustion chamber, and initiate an ignition process based on the determined ignition failure. The controller can be further configured to control a fuel flow to the igniter based on the received pressure signals.

The systems and techniques described here may provide one or more of the following advantages. First, a system can provide efficient ignition of fuel in a turbine engine. Second, the system can improve fuel efficiency of turbine engines.

The details of one or more implementations are set forth in the accompanying drawings and the description below. Other features and advantages will be apparent from the description and drawings, and from the claims.

BRIEF DESCRIPTION OF THE DRAWINGS

FIG. 4 is a sectional side view of the example igniter.

FIG. 8 is a diagram illustrating a velocity flow field achieved by operation of the example igniter system shown in FIGS. 6 and 7A-7C.

FIGS. 9A-9F show example fuel spray patterns of the example second igniter stages.

FIGS. 14A and 14B are side and sectional side views of another example igniter system.

DETAILED DESCRIPTION

In a turbine engine, the igniter ignites fuel released by combustor nozzles in a combustor of the engine to produce heated combustion products. The heated combustion products are, in turn, expanded through a turbine of the engine to produce torque. Reliable ignition and flame propagation around the primary combustor nozzles at lower air pressure drop (delta P), particularly in cold ambient conditions, may require a minimum level of energy provided to the operating envelope. In order to provide energy across a broad range of operating conditions, high-quality flame stability/operability of the igniter system is desired. In certain aspects, the present disclosure relates to an igniter system that supplies high energy, for example, by incorporating radial and/or axial air swirler components designed to create a strong recirculation zone in an auxiliary combustion chamber. In some implementations, optimization of the turbulence and swirling components is achieved to sustain the igniter flame without having to keep the spark ignition source on. In some implementations, additional fuel can be provided at an outlet of combustion to cause additional heat energy to be provided. In some implementations, an igniter in accordance with one or more embodiments of the present disclosure can improve cold combustor light off performance, and provide reliable re-light capability across a wide range of operating conditions by providing high energy release that is enhanced by swirl stabilized combustion in the combustor. In some implementations, the igniter in accordance with one or more embodiments may provide a near stoichiometric combustion process inside the combustor. Such a combustion process may produce higher gas temperature and trace amounts of chemically active species, which are beneficial for ignition in the primary combustor chamber (e.g., the combustor dome 106). A potential benefit achieved by the near stoichiometric combustion process is improved flame propagation within the primary combustor chamber, and less exhaust smoke during combustor start up periods.

Figure 1:
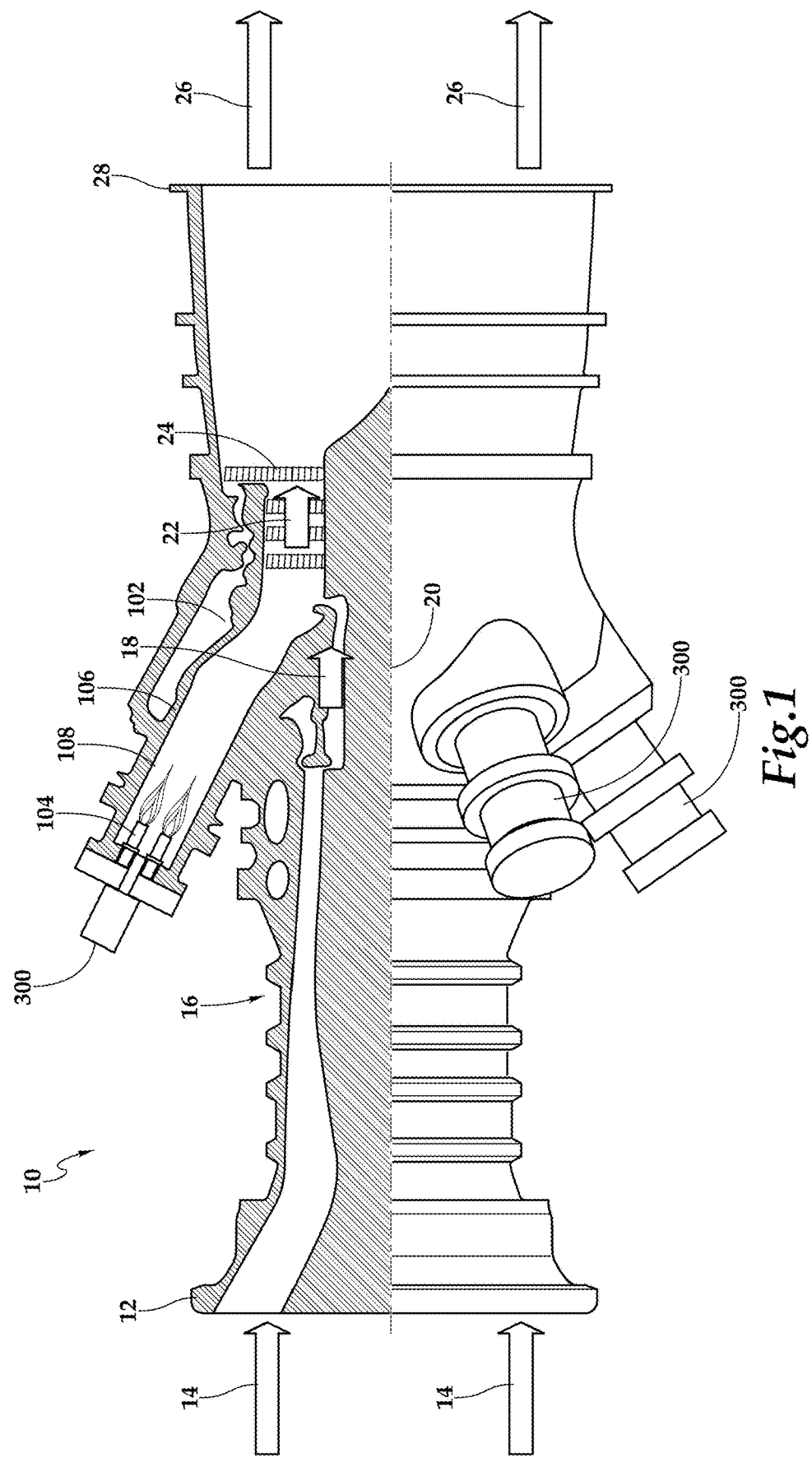
FIG. 1 is a half, side cross-sectional view of an example turbine engine.

FIG. 1 is a half, side cross-sectional view of an example turbine engine 10. The turbine engine 10 is a turbojet-type turbine that could be used, for example, to power jet aircraft. However, it is appreciated that the concepts described in the present disclosure are not so limited, and can be incorporated in the design of various other types of turbine engines, including stationary turbine engines used to drive a companion device, such as a generator or another device. In some implementations, the concepts herein can be adapted for use in other configurations of turbine engines, e.g., turbofan, turboprop, turboshaft, and other configurations.

As shown, the turbine engine 10 generally facilitates a continuous axial flow. That is, flow through the engine 10 is generally in the axially downstream direction indicated by the arrows in FIG. 1. The turbine engine 10 includes an intake 12 that receives ambient air 14 and directs the ambient air to a compressor 16. The ambient air 14 is drawn through multiple stages of the compressor 16. High-pressure air 18 exiting the compressor 16 is introduced to a combustor 100. In certain instances the combustor 100 is an annular combustor circumscribing the engine's main shaft 20 or a can-type combustor positioned radially outward of the shaft.

The combustor 100 includes a combustion shield 102, multiple primary fuel injectors 104, a combustor dome 106, and an igniter system 108 that, in certain instances, includes multiple spaced apart igniters. At the combustor 100, the high-pressure air 18 is mixed with liquid hydrocarbon fuel (not shown) and ignited by the igniter system 108 to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine by the main shaft 20. Exhaust gas 26 leaves the turbine 24 through an exhaust 28.

Figure 2A:
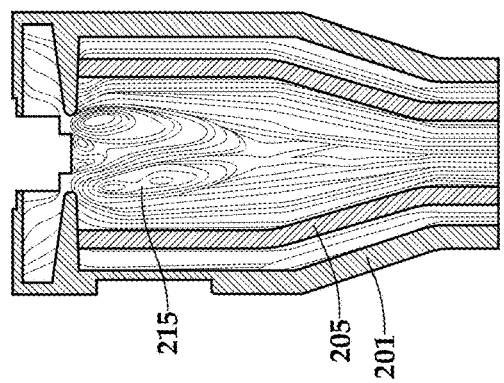
FIG. 2A is a half, side cross-sectional view of a first example igniter system.
Figure 2B:
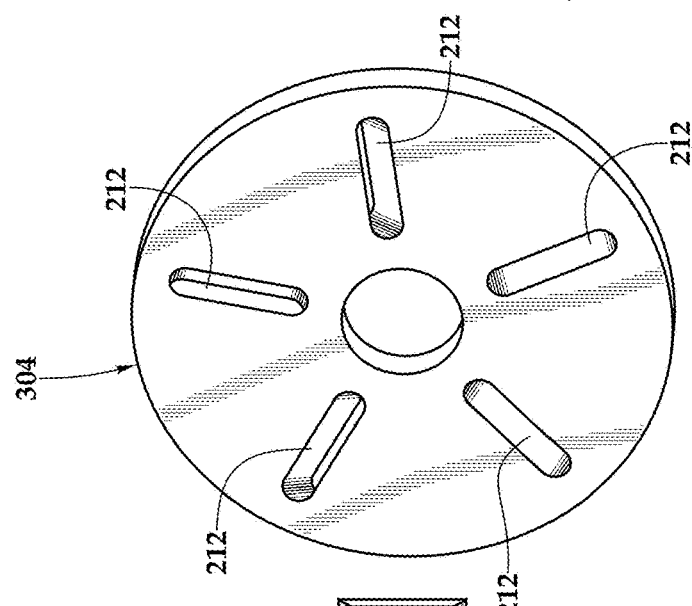
FIG. 2B is a perspective view of the example igniter system shown in FIG. 2A.
Figure 2C:
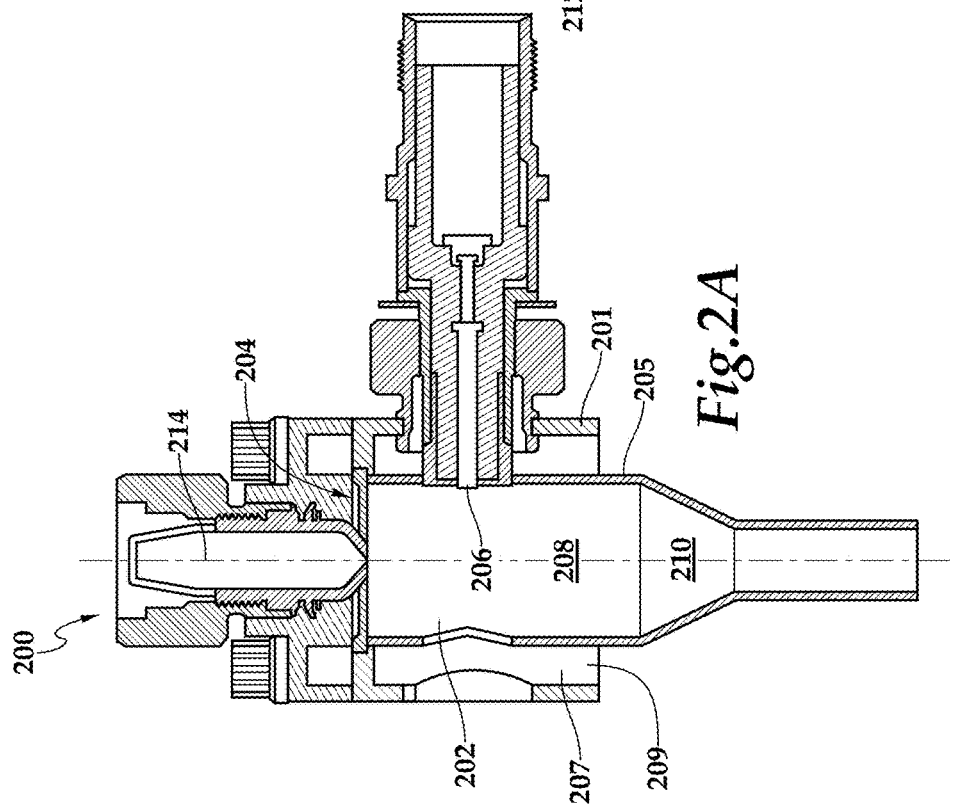
FIG. 2C is a diagram illustrating a velocity flow field achieved by operation of the example igniter system shown in FIG. 2A.

FIGS. 2A-2C show an example igniter 200 that can be used in the igniter system 108 of FIG. 1. As shown (see FIG. 2B), an axial air swirler 204 is disk-shaped and is coupled to the upper end of an auxiliary combustion chamber housing 205, spaced apart from the upper end of an inner chamber 203. The axial air swirler 204 includes a plurality of swirl openings 212 therethrough, provided in a circumferential pattern, surrounding the outlet of the auxiliary fuel injector 214 and oriented generally axially, at a non-zero angle relative to the longitudinal axis of the auxiliary combustion chamber 202 and auxiliary fuel injector 214. The swirl openings 212 are arranged to form a flow vortex along the longitudinal axis of the auxiliary combustion chamber 202. Fewer or more swirl openings 212 than are shown could be provided.

The flow area, orientation and number of swirl openings 212, as well as the shape of the auxiliary combustion chamber 202, is dimensioned, for example iteratively using computational fluid dynamics software, to produce a recirculation zone in the mixing chamber 208 near the outlet of the auxiliary fuel injector 214. The recirculating air/fuel flow 215 is shown by the velocity field flow lines in FIG. 2C as being generally toroidal around the outlet of the auxiliary fuel injector 214, flowing downward (away from the outlet of the auxiliary fuel injector 214) through the center of the auxiliary combustion chamber 202 and upward (back toward the outlet of the auxiliary fuel injector 214) along the interior sidewalls. The toroidal recirculation 215 extends the entire axial length of the mixing chamber 208, from the top end of the mixing chamber 208 to the bottom end of the mixing chamber 208, near the beginning of the necking of the throat region 210. The necking from the mixing chamber 208 to the throat region 210 contributes to forming the recirculating flow 215, as peripheral flow encountering the necking and reduced flow area is redirected back up the sidewall. The resulting turbulence and recirculation in the recirculation zone sustains combustion of the fuel from the auxiliary fuel injector 214 once ignited by the ignition source 206 without having to maintain the ignition source 206 on, because a portion of the ignited air/fuel is recirculated back into the incoming fuel from the auxiliary fuel injector 214. Moreover, the turbulence and recirculation tends to mix the combusting air/fuel with uncombusted air/fuel, tending to more evenly ignite the air/fuel throughout the auxiliary combustion chamber 202 and produce stronger, higher energy combustion.

Figure 3:
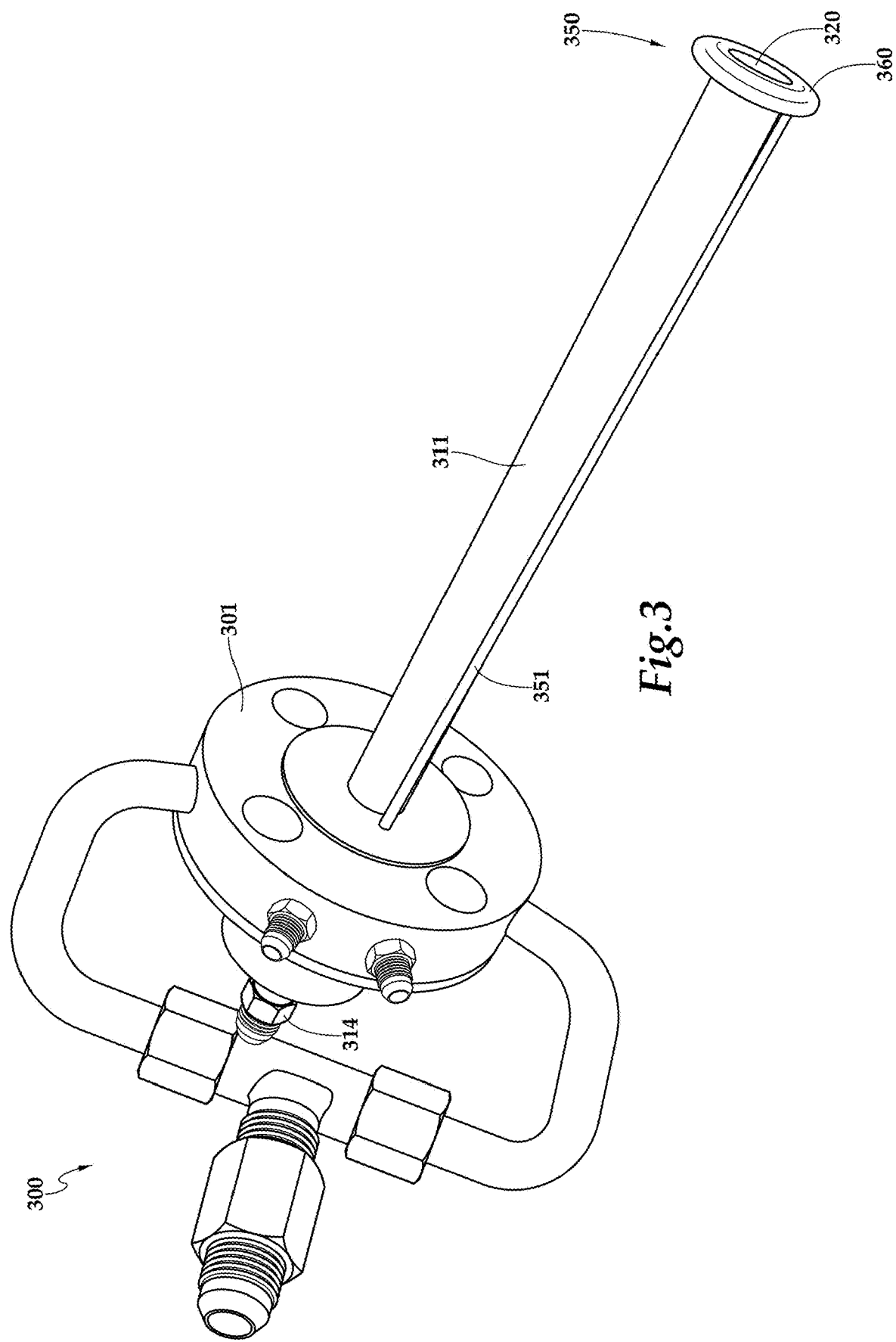
FIG. 3 is a perspective view of an example igniter.

FIG. 3 is a perspective view of an example igniter 300. FIG. 4 is a sectional side view of the example igniter 300. In some embodiments, the igniter 300 can be the example igniter system 108 of FIG. 1. In some embodiments, the igniter 300 can be a modification of the example igniter 200 of FIGS. 2A-2C.

Like the igniter 200, discussed above, the igniter 300 has an outer housing 301 with an interior chamber 303 (e.g., a primary combustion chamber); the interior chamber 303 is shown in FIGS. 3 and 4 as being substantially cylindrical. The outer housing 301 internally receives an auxiliary combustion chamber housing 305, defining an annular air passage 307 (e.g., a primary air inlet) between them. The auxiliary combustion chamber housing 305 abuts the upper end of the interior chamber 303. The annular air passage 307 includes an inlet 309 open to the primary combustion chamber. The auxiliary combustion chamber housing 305, also shown as being substantially cylindrical in FIGS. 3 and 4, defines an internal auxiliary combustion chamber 302. An ignition source 306, such as a spark generating igniter, is provided extending through a sidewall of the auxiliary combustion chamber 302.

The auxiliary combustion chamber housing 305 is shown defining a cylindrical mixing chamber 308 and a converging throat region 310, converging downstream of the mixing chamber 308 to a nozzle tube 311 (e.g., flame transfer tube, exit tube) that defines a tubular throat. In the illustrated example, the throat region 310 converges abruptly, forming a shoulder or step between the larger diameter of the mixing chamber 308 and the smaller diameter of the throat region 310, where the shoulder or step is orthogonal to the longitudinal axis of the auxiliary combustion chamber housing 305. In some embodiments, the ignition source 306 projects radially into the mixing chamber 308 of the auxiliary combustion chamber 302, downstream of the outlet of an auxiliary fuel injector 314. The auxiliary fuel injector 314 is positioned at the top of the auxiliary combustion chamber 302 with its outlet axially oriented to inject fuel coincident with the center axis of the auxiliary combustion chamber 302. The ignition source 306 ignites fuel output from the auxiliary fuel injector 314 in the auxiliary combustion chamber 302 and the converging throat region 310 and nozzle tube 311 nozzle the flow out of the auxiliary combustion chamber 302 to produce a flaming jet in the primary combustion chamber. The resulting flaming jet emerges at an outlet 320 that is generally positioned within the primary combustion chamber to combust air and fuel mixture in the primary combustion chamber.

The igniter 300 also includes a second igniter stage 350. The second igniter stage 350 includes an auxiliary fuel outlet manifold 360 arranged proximal to the outlet 320 of the tubular throat defined by the nozzle tube 311. The auxiliary fuel outlet manifold 360 is supported and positioned near the outlet 320 by a support arm 351. The support arm 351 defines a tubular fuel passage that extends from a first end affixed to the auxiliary fuel outlet manifold 360 and a second end affixed to the outer housing 301 proximal the auxiliary combustion chamber 352, and configured to space the auxiliary fuel outlet manifold 360 apart from the tubular throat of the nozzle tube 311. In some implementations, the igniter 300 can include a metering valve to control fuel flow to the second igniter stage 350 (e.g., to turn it on/off and control the fuel flow to multiple intermediate flow rates).

Figure 5A:
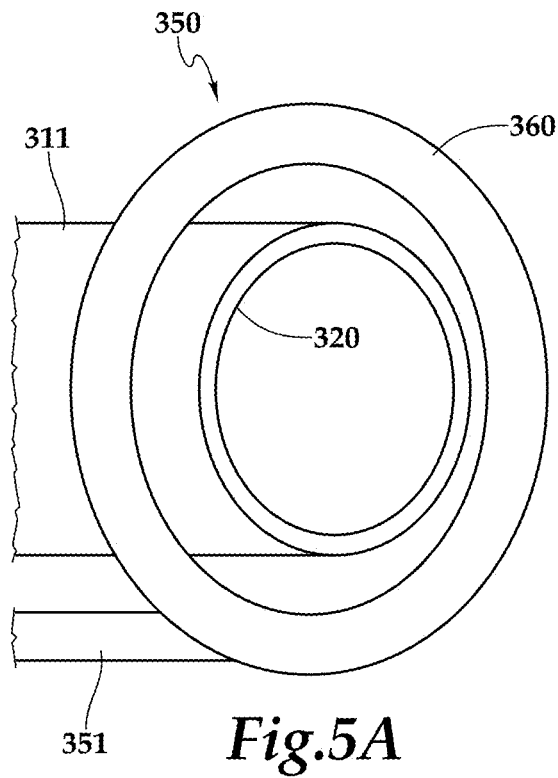
FIGS. 5A-5C are various views of an example second igniter stage.
Figure 5B:
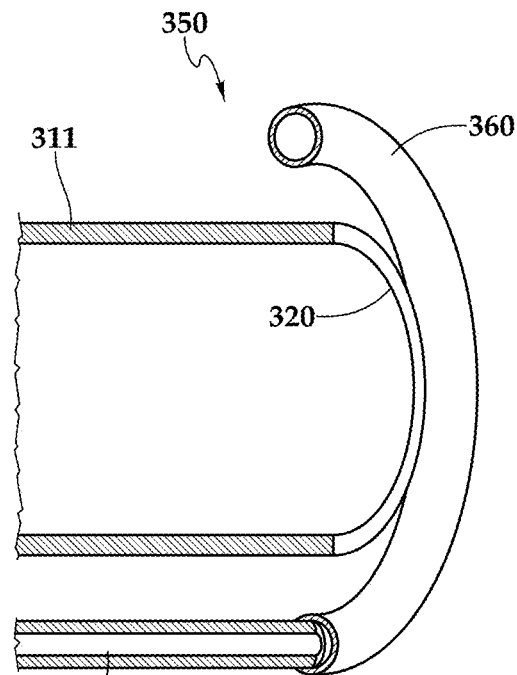
Figure 5C:
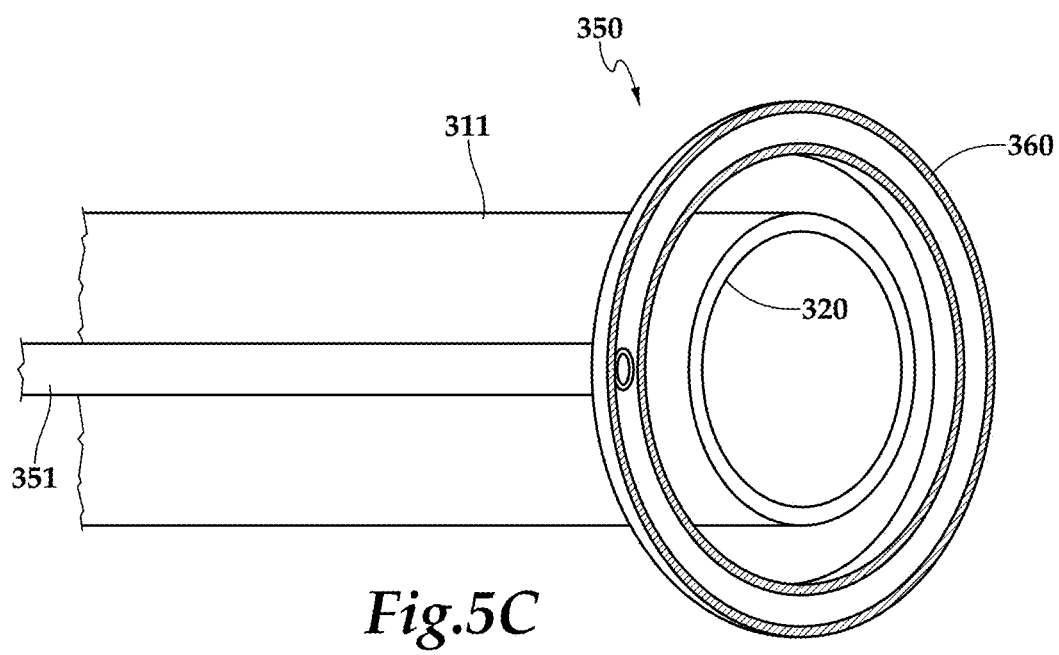

FIGS. 5A-5C are various views of the example second igniter stage 500 of FIGS. 3 and 4. The auxiliary fuel outlet manifold 360 has a generally toroidal shape around the outlet of the tubular throat of the nozzle tube 311. As will be discussed further in the description of FIG. 6, the auxiliary fuel outlet manifold 360 defines a collection of nozzles through which fuel can flow out and away from the auxiliary fuel outlet manifold 360 and toward the outlet 320. The illustrated configuration can provide additional fuel to combusting air and fuel mixture that emerges from the outlet 320. In certain instances, the resulting flaming jet reaches deeper into the primary combustion chamber than without the fuel enrichment, and provides a more stable, stronger (high heat energy), high surface area flame to combust air and fuel mixture in the primary combustion chamber.

Figure 6:
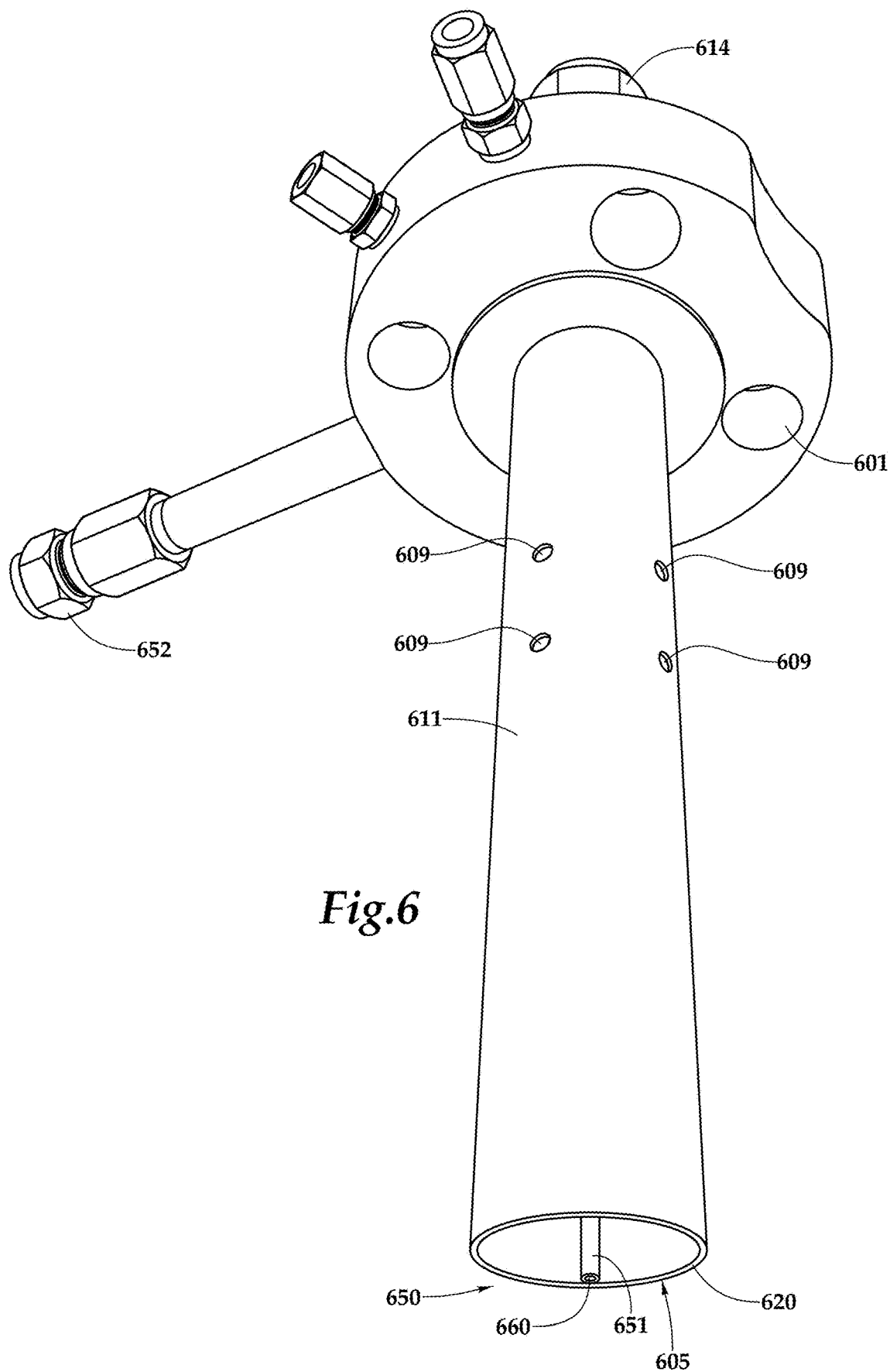
FIG. 6 is a perspective view of another example igniter.
Figure 7A:
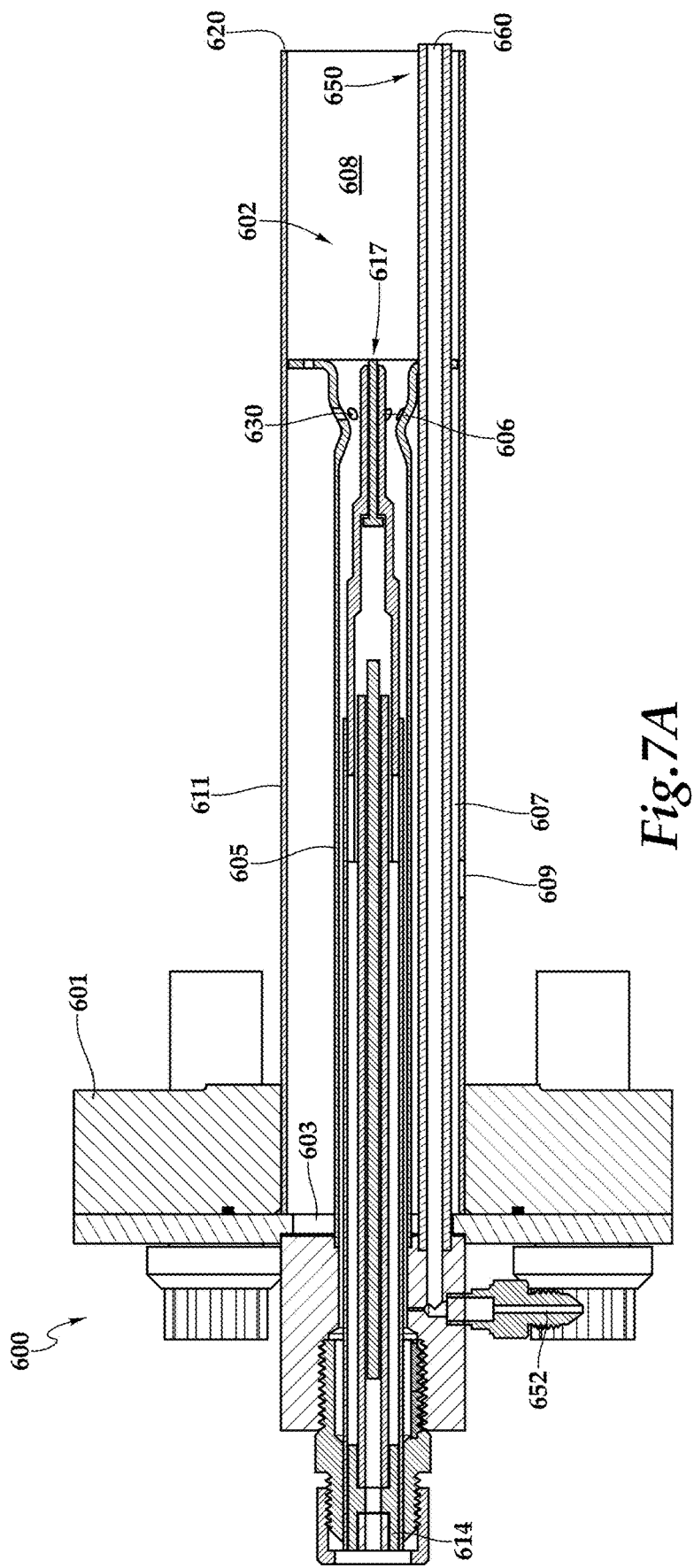
FIG. 7A is a sectional view of the example igniter of FIG. 6.
Figure 7C:
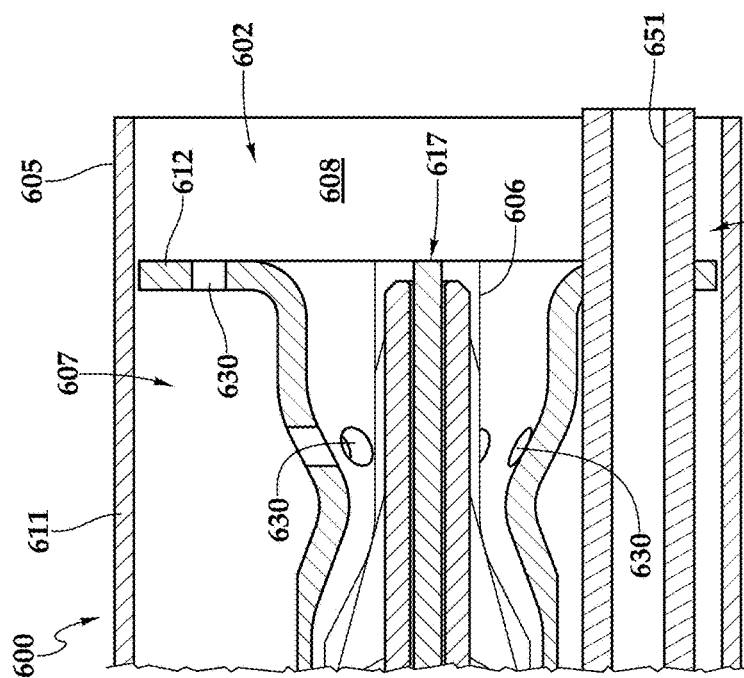
FIGS. 7B and 7C are enlarged sectional views of portions of the example igniter of FIG. 7A.
Figure 7B:
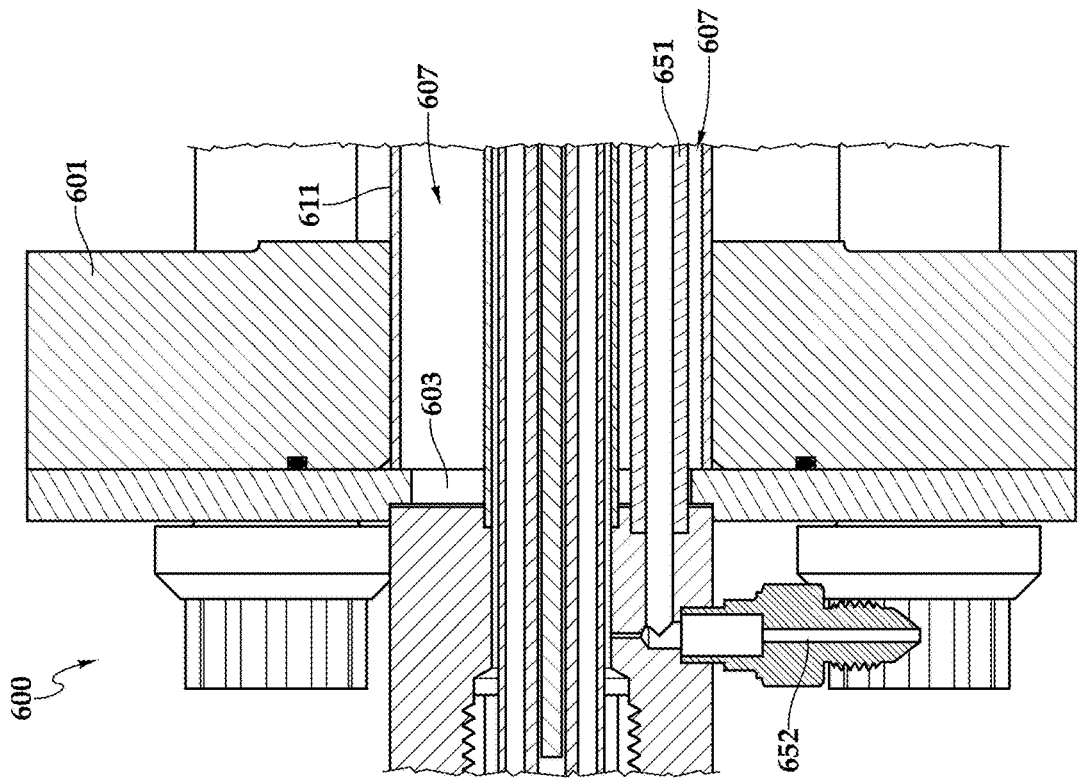

FIG. 6 is a perspective view of an example igniter 600. FIG. 7A is a sectional side view of the example igniter 600. FIGS. 7B and 7C are enlarged sectional side views of portions of the example igniter 600. In some embodiments, the igniter 600 can be the example igniter system 108 of FIG. 1. In some embodiments, the igniter 600 can be a modification of the example igniter 200 of FIGS. 2A-2C.

Like the igniter 200, discussed above, the igniter 600 has an outer housing 601 with an interior chamber 603; the interior chamber 603 is shown in FIGS. 6 and 7A-7C as being substantially cylindrical. The outer housing 601 internally receives a nozzle tube 611 (e.g., a flame transfer tube, an exit tube). An auxiliary combustion chamber housing 605 having an end face 612 is arranged within the nozzle tube 611, defining an annular air passage 607 between them. An ignition source 606, such as a spark generating igniter, is provided extending to an auxiliary combustion chamber 602. The annular air passage 607 includes a collection of inlets 609 open to the primary combustion chamber, and a collection of outlets 630 open to the auxiliary combustion chamber 602 proximal a spark location 617 of the ignition source 606. The end face 612 and the auxiliary combustion chamber housing 605, also shown as being substantially cylindrical in FIGS. 6, 7A, and 7C, defines the internal auxiliary combustion chamber 602. In use, air flows into the annular air passage 607 at the collection of inlets 609, and flows out to the auxiliary combustion chamber through the collection of outlets 630.

The auxiliary combustion chamber housing 605 is shown defining a cylindrical mixing chamber 608 within the nozzle tube 611 that defines a tubular throat. In the illustrated example, the cylindrical mixing chamber 608 is supported by the nozzle tube 611 such that the cylindrical mixing chamber 608 is suspended within a primary combustor chamber (e.g., the combustor dome 106 of FIG. 1). Although shown coaxial to the auxiliary combustion chamber housing 605 in FIGS. 7A-7C, in some embodiments, the ignition source 606 projects laterally into the mixing chamber 608 of the auxiliary combustion chamber 602, downstream of the outlet of an auxiliary fuel injector 614. The auxiliary fuel injector 614 is positioned at the top of the auxiliary combustion chamber 602 with its outlet axially oriented to inject fuel coincident with the center axis of the auxiliary combustion chamber 602. The ignition source 606 ignites fuel output from the auxiliary fuel injector 614 in the auxiliary combustion chamber 602 and the nozzle tube 611 directs the flow out of the auxiliary combustion chamber 602 to produce a flaming jet in the primary combustion chamber. The resulting flaming jet emerges at an outlet 620 that is generally positioned within the primary combustion chamber to combust air and fuel mixture in the primary combustion chamber.

Figure 9D:
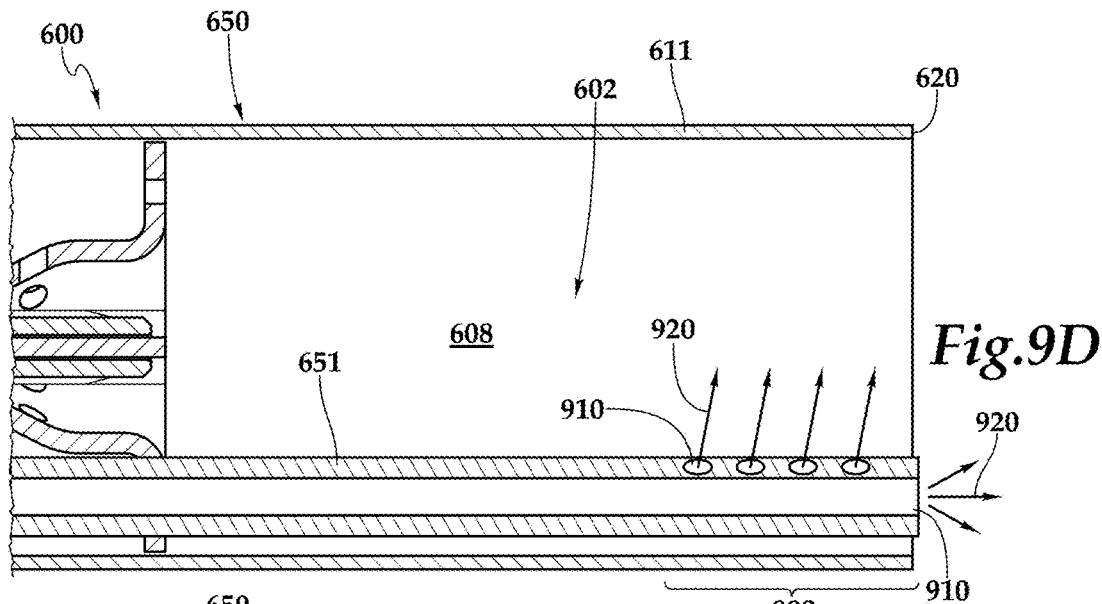
Figure 9E:
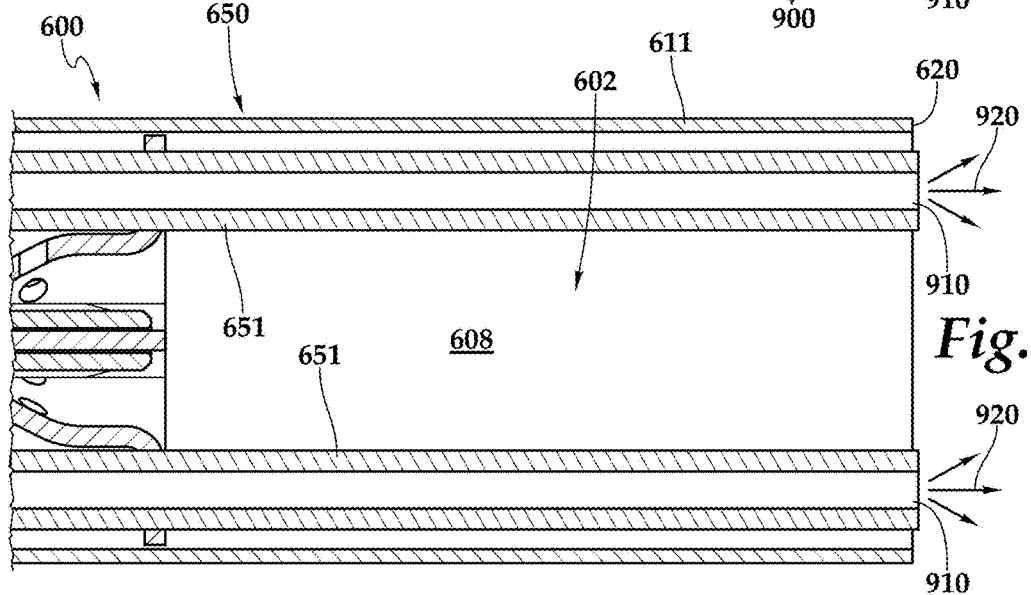
Figure 9F:
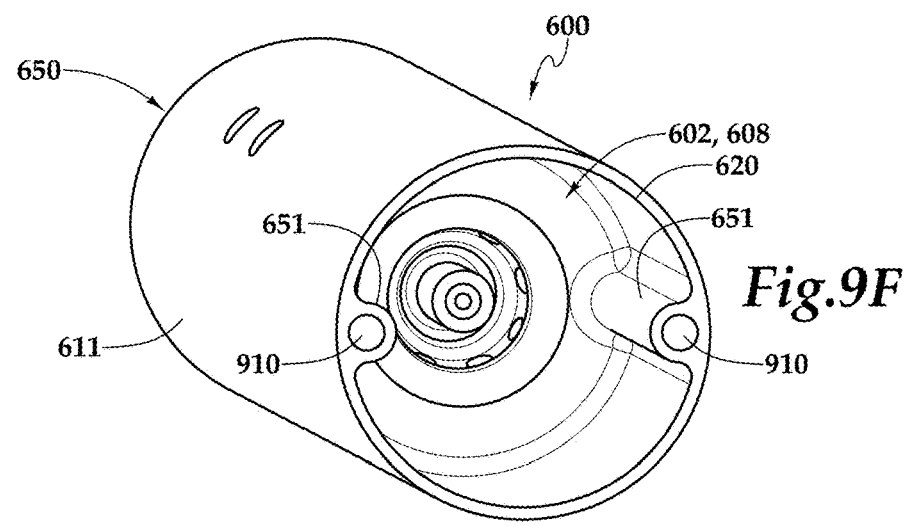

The igniter 600 also includes a second igniter stage 650. The second igniter stage 650 includes an auxiliary fuel outlet 660 arranged proximal to the outlet 620 of the nozzle tube 611. The auxiliary fuel outlet 660 is fluidically connected to a fluid inlet 652 by a fluid supply conduit 651. In some embodiments, the igniter 600 can include multiple fluid supply conduits 651 fluidically connecting the fluid inlet 652 to multiple auxiliary fuel outlets 660, as will be discussed further in the descriptions of FIGS. 9E and 9F. The fluid supply conduit 651 defines a tubular fuel passage that extends from the fluid inlet 652 to the auxiliary fuel outlet 660. In some implementations, the igniter 600 can include a metering valve to control fuel flow to the second igniter stage 650 (e.g., to turn it on/off and control the fuel flow to multiple intermediate flow rates). The illustrated configuration can provide additional fuel to combusting air and fuel mixture that emerges from the outlet 620. In certain instances, the resulting flaming jet reaches deeper into the primary combustion chamber than without the fuel enrichment, and provides a more stable, stronger (high heat energy), high surface area flame to combust air and fuel mixture in the primary combustion chamber.

In some embodiments, the auxiliary fuel outlet 660 can also include an auxiliary fuel outlet manifold arranged about the periphery of the internal surface of the mouth of the outlet 620. For example, the auxiliary fuel outlet manifold can have a generally toroidal shape around the outlet of the tubular throat of the nozzle tube 611. As will be discussed further in the description of FIGS. 9A-9D, auxiliary fuel outlet manifolds can define a collection of nozzles through which fuel can flow out and away from the auxiliary fuel outlet 660 and toward the outlet 620.

FIG. 8 is a diagram illustrating a velocity flow field achieved by operation of the auxiliary combustion chamber 602 shown in FIGS. 6 and 7A-7C. As shown, outlets 630 are provided in a circumferential pattern, surrounding the spark location 617 of the ignition source 606 and oriented generally axially, at a non-zero angle relative to the longitudinal axis of the auxiliary combustion chamber 602. The outlets 630 are arranged to form a toroidal flow vortex 802 along the longitudinal axis of the auxiliary combustion chamber 602. Fewer or more outlets 630 than are shown could be provided. In certain instances, the upper end of the mixing chamber 608 can have a different diameter that the remainder of the mixing chamber 608.

The flow area, orientation and number of the outlets 630, as well as the shape of the auxiliary combustion chamber 602, is dimensioned, for example iteratively using computational fluid dynamics software, to produce a recirculation zone in the mixing chamber 608 near the outlet 620. The recirculating air/fuel flow 815 is shown by the velocity field flow lines in FIG. 8 as being generally toroidal around the outlet of the spark location 617, flowing downward (away from spark location 617) through the center of the auxiliary combustion chamber 602 and upward (back toward the outlets 630) along the interior sidewalls. The toroidal recirculation 815 extends the entire axial length of the mixing chamber 608, from the top end of the mixing chamber 608 to the bottom end of the mixing chamber 608. The resulting turbulence and recirculation in the recirculation zone sustains combustion of the fuel once ignited by the ignition source 606 without having to maintain the ignition source 606 on, because a portion of the ignited air/fuel is recirculated back into the incoming fuel. Moreover, the turbulence and recirculation tends to mix the combusting air/fuel with uncombusted air/fuel, tending to more evenly ignite the air/fuel throughout the auxiliary combustion chamber 602 and produce stronger, higher energy combustion.

In certain instances, if a torch igniter system operates in an intermittent manner (e.g., repeated on/off cycles) and during shut-down, coke formation due to stagnant fuel can restrict the fuel flow passages in the auxiliary fuel injector. This effect can be more pronounced because of the smaller passageways required for lower fuel flow rates. Thus, in some implementations, there is a need to purge or cool the fuel injectors during those times when the torch is off. Some embodiments of a torch igniter system can include being designed to provide purging and cooling of the auxiliary fuel injector with little or no additional hardware.

FIG. 9A shows an example fuel spray pattern of the example second igniter stage 350 of FIGS. 3-5C. The auxiliary fuel outlet manifold 360 defines a collection of nozzles 910 defined as a circumferential pattern of fuel openings through which fuel can flow out and away from the auxiliary fuel outlet manifold 360 and toward the outlet 320. In the illustrated example, the nozzles 910 emit fuel flow as a collection of fuel jets 920 concentrated around the lines depicted in the figure. The nozzles 910 are configured to flow fuel, as the fuel jets 920, away from the auxiliary fuel outlet manifold 360 toward the center of the outlet 320 of the tubular throat region. The sizes, angles, and/or quantity of the nozzles 910 are configured to promote mixing of the additional fuel with the main exhaust stream exiting the outlet 320. For example, the nozzles 910 can be distributed substantially uniformly about the auxiliary fuel outlet manifold 360 to avoid flame quenching, and their distance(s) from the main stream can be configured in order to maintain a predetermined jet to cross flow ratio.

FIGS. 9B-9F show example fuel spray patterns of the example second igniter stage 650 of FIGS. 6-7C. In some embodiments, the auxiliary fuel outlet 660 can include an auxiliary fuel outlet manifold 900 that defines a collection of nozzles 910 defined as a circumferential pattern of fuel openings through which fuel can flow out and away from the auxiliary fuel outlet manifold 900. In the illustrated examples, the nozzles 910 emit fuel flow as a collection of fuel jets 920 concentrated around the lines depicted in the figure. The nozzles 910 are configured to flow fuel, as the fuel jets 920, away from the auxiliary fuel outlet manifold 900 toward the center of the outlet 620 of the tubular throat region. In the illustrated examples, the nozzles 910 are distributed substantially uniformly about the auxiliary fuel outlet manifold 900 to avoid flame quenching, and their distance(s) from the main stream can be configured in order to maintain a predetermined jet to cross flow ratio.

The sizes, angles, and/or quantity of the nozzles 910 are configured to promote mixing of the additional fuel with the main exhaust stream exiting the outlet 620. In the example illustrated in FIG. 9B, the nozzles 910 are arranged about an axial end face of the periphery of the outlet 620, and are configured to direct the fuel jets 920 toward the center of the outlet 320. In the example illustrated in FIG. 9C, the nozzles 910 are arranged about an interior surface of the periphery of the outlet 620, and are configured to direct the fuel jets 920 toward the center of the outlet 320. In the example illustrated in FIG. 9D, the nozzles 910 are defined along a section of nozzle tube 611 proximal the outlet 620, and are configured to direct the fuel jets 920 toward the center of the outlet 320. In the example illustrated in FIGS. 9E and 9F, the nozzle tube 611 includes two fluid supply conduits 651 fluidically connecting the fluid inlet 652 to two auxiliary fuel outlets 660. Fuel exiting the auxiliary fuel outlets 660 forms multiple fuel jets 920 that are directed toward a secondary combustion region. In some embodiments, any appropriate number of fluid supply conduits 651 may be used to convey fluid to any appropriate number of fluid outlets near the outlet 620.

In some examples, such as during turbine startup, the various components of the example igniter 300 or 600 can be cold (e.g., ambient temperature). When components such as the nozzle tube 311 or 611 are cold, some of the heat energy of the combusting fuel and air mixture can be absorbed by the nozzle tube 311 or 611, leaving a relatively cool, lean flame at the outlet 320 or 620. The remaining heat energy may be insufficient to reliably ignite the primary combustion fuel mixture in the turbine, but it may be sufficient to ignite the additional fuel that is provided by the auxiliary fuel outlet manifold 360. The combustion of this additional fuel can generate additional heat energy that can, in turn, facilitate reliable ignition of the primary combustion fuel mixture in the turbine.

In some examples, such as when a turbine is subjected to sudden loads, the turbine can slow which can reduce compression and the combustibility of the turbine primary combustion fuel mixture. In such examples, the auxiliary fuel manifold 510 can facilitate reliably re-lighting the primary combustion fuel mixture.

In some implementations, the main combustion process of a turbine can be run on a variety of different types of primary fuels (e.g., natural gas, diesel, kerosene, jet-A, crude oil, biofuels) having different tendencies to atomize in order to promote combustion. For example, natural gas already exists as a gas in its combustible form, while crude oil is generally an extremely viscous liquid that can be difficult to atomize. In such examples, the auxiliary fuel manifold 510 may be disengaged for use with natural gas, but may be engaged to provide additional heat in order to promote combustion of the heavier crude oil.

Figure 10:
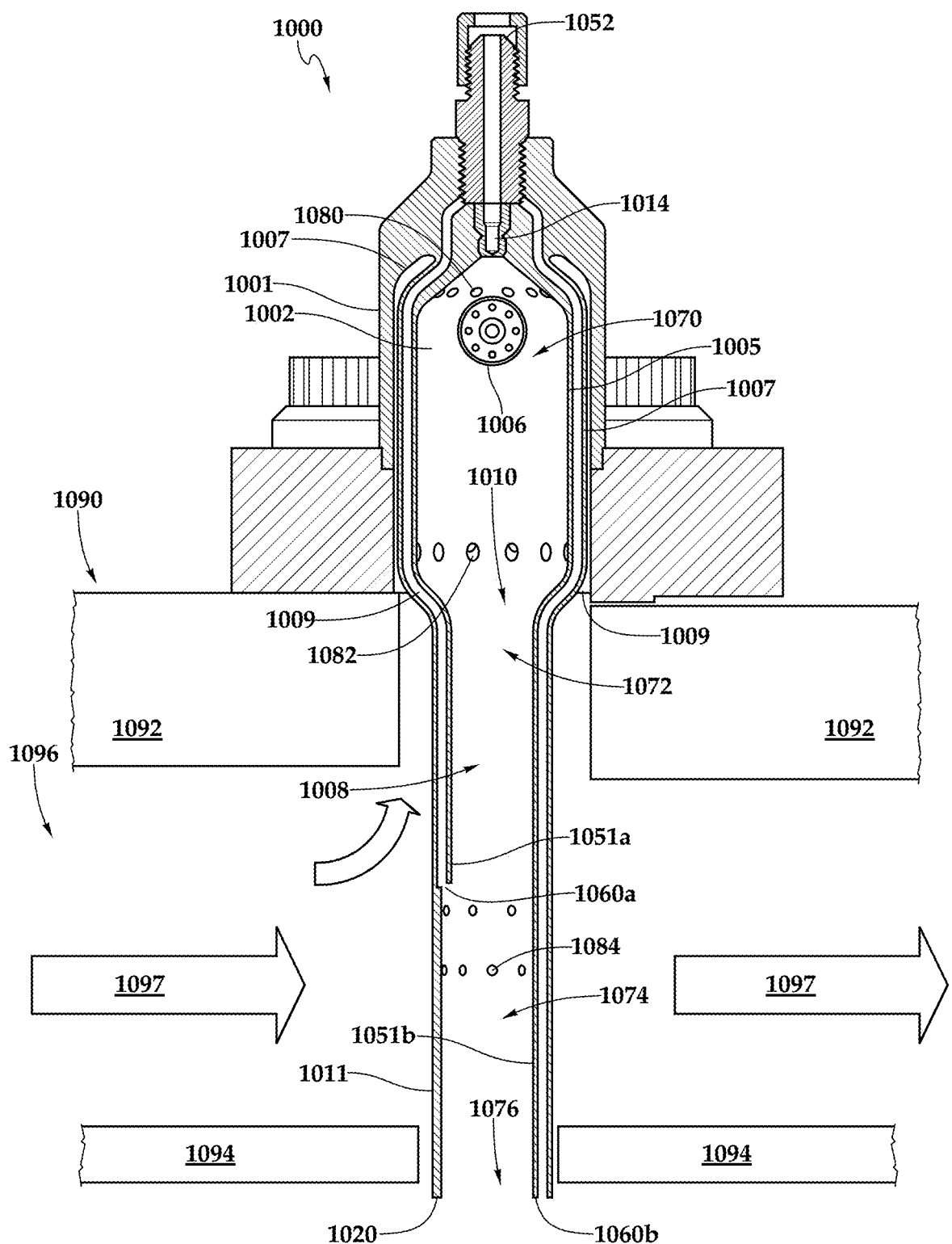
FIG. 10 is a sectional view of an example cross-flow igniter system.

FIG. 10 is a sectional view of an example cross-flow igniter 1000. In some embodiments, the igniter 1000 can be a modification of the example igniter 300 or 600 of FIGS. 3, 4, and 6-7C. In general, a turbine engine 1090 includes a mounting casing 1092 arranged about an engine liner 1094, with an air passage 1096 defined in between. The igniter 1000 is configured as a cross-flow igniter, in which the igniter 1000 extends through the mounting casing 1092 and the engine liner 1094 such that the primary axis of the igniter 1000 is oriented about 90 degrees relative to a flow of air (represented by arrow 1097) through the air passage 1096.

The outer housing 1001 internally receives an auxiliary combustion chamber housing 1005, defining an annular air passage 1007 between them. The auxiliary combustion chamber housing 1005 abuts the upper end of a nozzle tube 1011 (e.g., flame transfer tube, exit tube) that defines a tubular throat. The annular air passage 1007 includes an inlet 1009 open to the annular air passage 1007. The auxiliary combustion chamber housing 1005, shown as being substantially cylindrical in FIG. 10, defines an auxiliary mixing chamber 1008. An ignition source 1006, such as a spark generating igniter, is provided extending through a sidewall of the auxiliary mixing chamber 1002. In some embodiments, the ignition source 1006 projects radially into the mixing chamber 1008, downstream of the outlet of an auxiliary fuel injector 1014. The auxiliary fuel injector 1014 is positioned at the top of the auxiliary combustion chamber housing 1005 with its outlet axially oriented to inject fuel coincident with the center axis of the auxiliary combustion chamber housing 1005. In use, air from the annular air passage 1007 flows into the auxiliary mixing chamber 1002 through a collection of outlets 1080 to mix with fuel and become ignited by the ignition source 1006 to form a first stage reaction zone 1070.

The auxiliary combustion chamber housing 1005 is shown defining the auxiliary mixing chamber 1002 and a converging throat region 1010, converging downstream of the auxiliary mixing chamber 1002 to the nozzle tube 1011. The converging throat region 1010 and nozzle tube 1011 nozzle the flow of combusting air and fuel out of the auxiliary mixing chamber 1002 and into an auxiliary mixing chamber 1008.

The converging throat region 1010 includes a collection of inlets 1082 open to the air passage 1007. In use, air flows from the annular air passage 1007 though the collection of inlets 1082, and into the auxiliary mixing chamber 1008. In use, ignited fuel flows from the first stage reaction zone 1070 and mixes with additional air from the collection of inlets 1082 to further promote combustion at a second stage reaction zone 1072.

A fluid supply conduit 1051*a* fluidically connects a fluid inlet 1052 to a fuel outlet 1060*a*. The fuel outlet 1060*a* is open proximal to a midpoint of the nozzle tube 1011. A collection of inlets 1084 allow additional air from the air passage 1096 to enter the auxiliary mixing chamber 1008. In use, air flows through the inlets 1084 to mix with additional igniter fuel provided at the fuel outlet 1060*a*, and this mixture is ignited by the combusting air and fuel from the second stage reaction zone 1072 to promote additional combustion at a third stage reaction zone 1074.

The igniter 1000 also includes a fourth stage reaction zone 1076. At the fourth stage reaction zone 1076, an auxiliary fuel outlet 1060*b* is arranged proximal to the outlet 1020 of the nozzle tube 1011. The auxiliary fuel outlet 1060*b* is fluidically connected to the fluid inlet 1052 by a fluid supply conduit 1051*b*. In some embodiments, the igniter 1000 can include any appropriate number of fluid supply conduits, such as the fluid supply conduits 1051*a* and 1051*b*, to fluidically connect the fluid inlet 1052 to multiple auxiliary fluid outlets, such as the fuel outlets 1060*a* and 1060*b*. The fluid supply conduit 1051*b* defines a tubular fuel passage that extends from the fluid inlet 1052 to the auxiliary fuel outlet 1060*b*.

In some implementations, the igniter 1000 can include one or more metering valves to control fuel flow to third stage reaction zone 1074 and/or the fourth stage reaction zone 1076 (e.g., to turn them on/off and control the fuel flow to multiple intermediate flow rates). The illustrated configuration can provide additional igniter fuel to the combusting air and fuel mixture that emerges from the outlet 1020. In certain instances, the resulting flaming jet reaches deeper into the primary combustion chamber than without the fuel enrichment, and provides a more stable, stronger (high heat energy), high surface area flame to combust air and fuel mixture in the primary combustion chamber.

Figure 11:
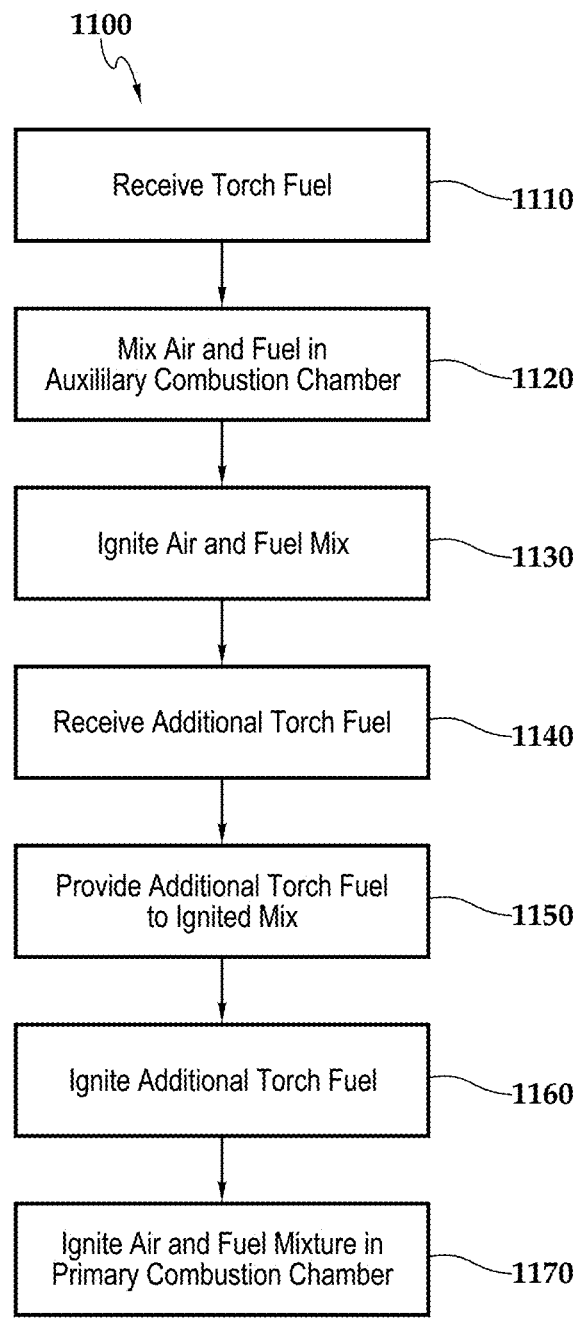
FIG. 11 is a flow diagram of an example process for igniting an air and fuel mixture.

FIG. 11 is a flow diagram of an example process 1100 for igniting an air and fuel mixture. In some implementations, the process 1100 can be used with the example igniters 300, 600, or 1000 of FIGS. 3, 4, 6-7C, and 10.

At 1110, fuel is received into an auxiliary combustion chamber of a first igniter stage of a turbine combustor assembly. For example, fuel can be received in the auxiliary combustion chamber 302, or 602, or the auxiliary mixing chamber 1002.

At 1120 mixing air incoming into the auxiliary combustion chamber with the fuel. For example, air can be mixed with fuel in the auxiliary combustion chamber 302 or 602, or the auxiliary mixing chamber 1002.

At 1130, the air and fuel mixture are ignited in the auxiliary combustion chamber. For example, the air and fuel mixture in the auxiliary combustion chamber 302 can be ignited by the ignition source 306, or the auxiliary combustion chamber 602 can be ignited by the ignition source 606, or the auxiliary mixing chamber 1002 can be ignited by the ignition source 1006.

At 1140, additional fuel is received into an auxiliary fuel outlet manifold of a second igniter stage arranged proximal an outlet of the auxiliary combustion chamber. In some implementations, the auxiliary fuel outlet manifold can include a support arm having a first end affixed to the auxiliary fuel outlet manifold and a second end affixed to the igniter proximal the auxiliary combustion chamber, and configured to space the auxiliary fuel outlet manifold apart from the tubular throat. In some implementations, an igniter can include a fuel manifold and the support arm can define a tubular fuel passage configured to provide a fluid passage from the fuel manifold to the auxiliary fuel outlet manifold. For example, fuel can flow through the support arm 351 to the auxiliary fuel outlet manifold 360. In some implementations, the additional fuel can be the same type of fuel supplied to the auxiliary combustion chamber (supplied from the same or a different source) or it can be a different fuel.

In some implementations, the auxiliary combustion chamber can have a generally toroidal shape around the outlet of the tubular throat, flowing away from the auxiliary fuel outlet manifold toward the center of the tubular throat region. In some implementations, the auxiliary fuel outlet manifold defines a circumferential pattern of fuel openings.

For example, the auxiliary fuel outlet manifold 360 includes the nozzles 910, which are configured to flow the fuel jets 920 away from the auxiliary fuel outlet manifold 360 and toward the center of the outlet 320 of the tubular throat region. In some implementations, the auxiliary fuel outlet can be an opening in or open end of tubular fluid passage, such as the auxiliary fuel outlets 660, 1060a, or 1060b, or the nozzles 910.

At 1150, additional fuel is provided by the auxiliary fuel outlet manifold to the ignited air and primary fuel mixture proximal the outlet. For example, the collection of nozzles 910 can direct fuel from the auxiliary fuel outlet manifold 360 as the jets 920 into the axially outward path defined the outlet 320.

In some implementations, the process 1100 can also include receiving the additional igniter fuel from a fuel manifold, and providing the additional igniter fuel through a tubular fuel passage defined by the support arm to the auxiliary fuel outlet manifold. For example, the fluid supply conduit 651 can receive fuel from the fuel inlet 652 and convey the fluid to the auxiliary fuel outlet 660.

At 1160, the ignited air and fuel mixture ignites the additional fuel provided by the auxiliary fuel outlet manifold. For example, the combusting air and fuel mixture exiting the outlet 320 or 620 can ignite the fuel in the jets 920.

At 1170, a primary air and fuel mixture, in a primary combustion chamber of the turbine combustor assembly, is ignited with combusting air, fuel, and additional fuel. For example, the combusting air and fuel mixture which is enrichened by the additional fuel provided by the auxiliary fuel outlet manifold 360, can ignite a mixture of fuel and air in the example combustor 100 of FIG. 1.

In some implementations, the process 1100 can also include providing, by a second auxiliary fuel outlet manifold, second additional igniter fuel to the combusting air and fuel mixture at a midpoint of a tubular throat configured to direct the ignited air and fuel mixture to the outlet, and igniting, by the combusting air and fuel mixture, the second additional igniter fuel to provide a second combusting air and fuel mixture, wherein the second air and fuel mixture is further ignited by the second combusting air and fuel mixture. For example, in the example igniter 1000, some additional fuel can be provided partway along the nozzle tube 611 at the auxiliary fuel outlet 1060a, and some more additional fuel can be provided proximal the outlet 1020 at the auxiliary fuel outlet 1060b. Each amount of additional fuel can be ignited by combustion caused by a previous stage within the igniter 1000 (e.g., combustion in the first stage reaction zone 1070 can ignite combustion in the second stage reaction zone 1072, which can ignite further combustion in the third stage reaction zone 1074, which can ignite further combustion in the fourth stage reaction zone 1076. Some or all of these combustion processes can then ignite combustion in a primary combustion chamber of a turbine engine.

Figure 12A:
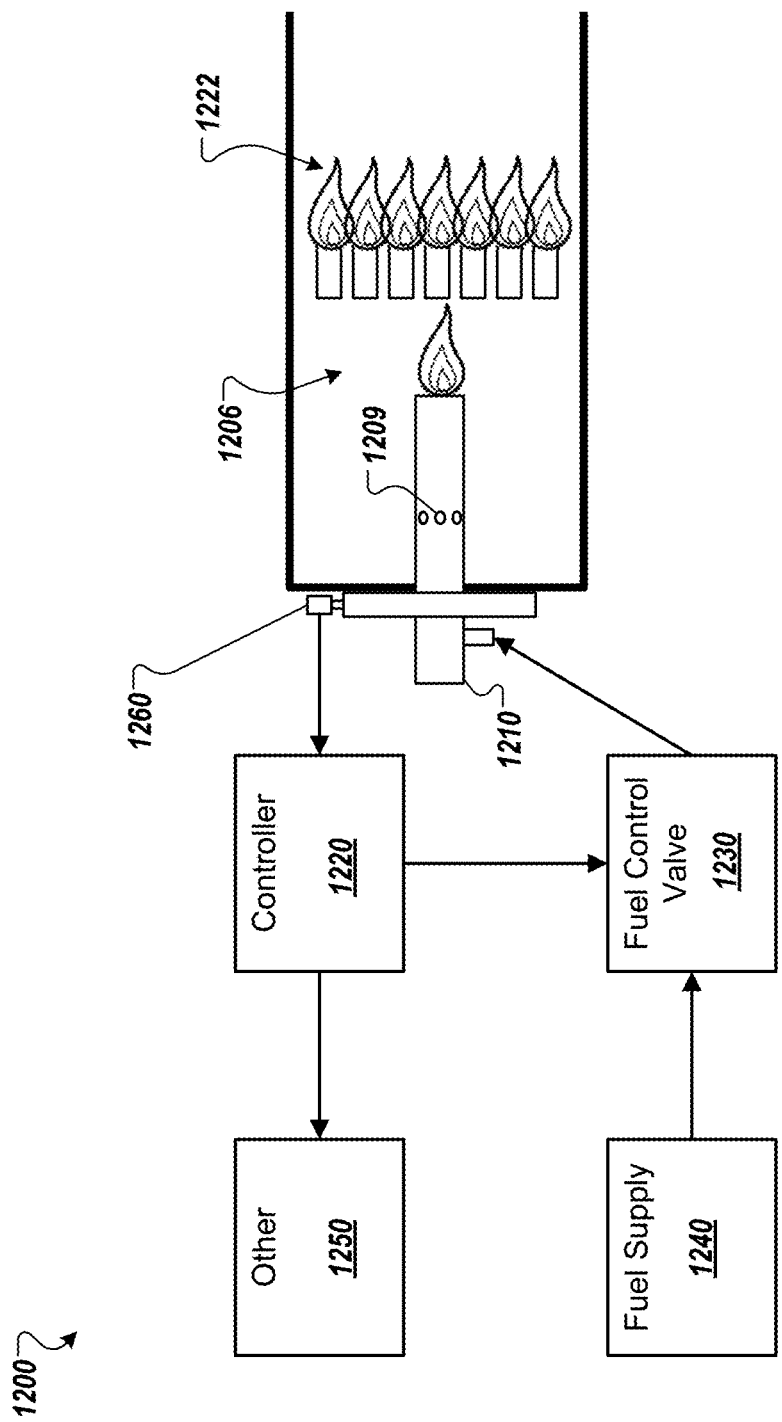
FIGS. 12A and 12B are schematic diagrams of an example feedback-controlled igniter system having an example torch igniter.
Figure 12B:
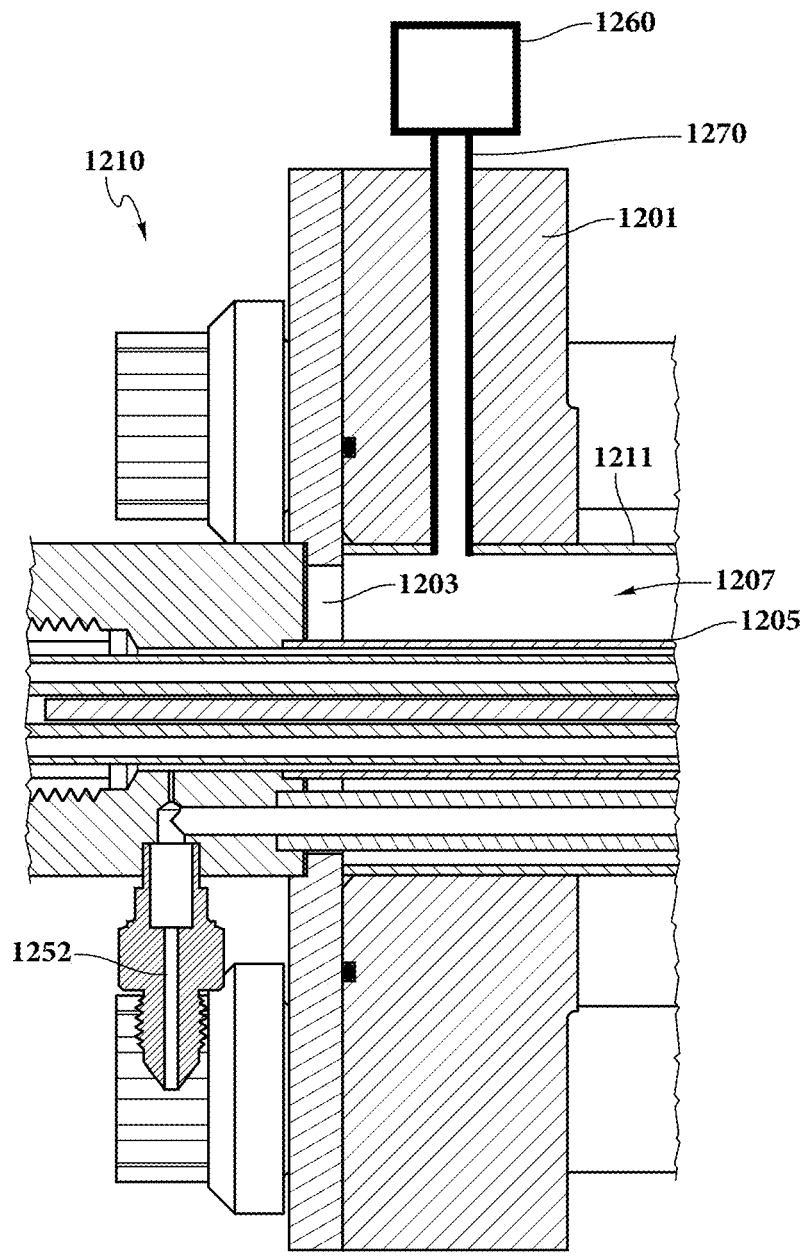

FIG. 12A is a schematic diagram of an example feedback-controlled igniter system 1200 having an example torch igniter 1210. FIG. 12B is an enlarged sectional view of a portion of the torch igniter 1210 of FIG. 12A. In some embodiments, the feedback-controlled igniter system 1200 can be the example igniter system 108 of FIG. 1. In some embodiments, the feedback-controlled igniter system 1200 can be a modification of the example igniter 200 of FIGS. 2A-2C.

The example system 1200 includes a controller 1220 that is configured to actuate a fuel control valve 1230 to control a flow of fuel from a fuel supply 1240 to the igniter 1210. The controller 1220 is also configured to control delivery of spark energy to the igniter 1210 to ignite the fuel and provide torch igniter heat energy to ignite a fuel and air mixture in a primary combustion chamber 1206. High-pressure air is mixed with liquid hydrocarbon fuel (not shown) and ignited by the igniter system 1200 to produce heated combustion products 1222. The controller 1220 is also configured to provide output signals to another system 1250. For example, the controller can provide alarms, displays, operational information, and any other appropriate types of indicators and signals that are indicative of the operation of the system 1200.

The process of controlling the fuel control valve 1230 is based at least in part on pressure feedback signals received from a pressure sensor 1260. FIG. 12B shows an example arrangement of the pressure sensor 1260 in more detail.

Like the igniter 600, discussed above, the igniter 1210 has an outer housing 1201 with an interior chamber 1203. The outer housing 1201 internally receives a nozzle tube 1211 (e.g., a flame transfer tube, an exit tube). An auxiliary combustion chamber housing 1205 is arranged within the nozzle tube 1211, defining an annular air passage 1207 between them. The annular air passage 1207 includes a collection of inlets 1209 open to the primary combustion chamber 1206. An auxiliary fuel injector (e.g., the example auxiliary fuel injector 614 of FIGS. 6, 7A, and 7B) is positioned at the top of the auxiliary combustion chamber 1202. A fluid inlet 1252 is connected to an auxiliary fuel outlet (e.g., the auxiliary fuel outlet 660 of FIGS. 6, 7A, and 7C).

The igniter 1210 includes the pressure sensor 1260. The pressure sensor 1260 is configured to sense pressure within primary combustor chamber (e.g., the example combustor dome 106 of FIG. 1). A fluid conduit 1270 (e.g., a gas passage) fluidically connects the pressure sensor 1260 to the annular air passage 1207.

In some embodiments, by defining the fluid conduit 1270 through the outer housing 1201, the igniter 1210 can comply with existing mechanical specifications while also providing a pressure-sensing capability. In some embodiments, this arrangement can help protect the pressure sensor 1260, for example, by allowing the pressure sensor 1260 to be located away from the harsh (e.g., hot, dirty) environment created within the primary combustor chamber during combustion. Since the pressure sensor 1260 is in fluid communication with the annular air passage 1207, and the annular air passage 1207 is in fluid communication with the primary combustion chamber 1206 (e.g., through the inlets 1209), pressures in the primary combustion chamber 1206 will propagate back to the fluid conduit 1270 where they can be sensed by the pressure sensor 1260. Dynamic pressures that occur within the primary combustion chamber 1206, for example, due to production of the heated combustion products 1222, can be sensed by the pressure sensor 1260 and used by the controller 1220 for purposes such as control, presentation, and/or analysis.

While in the illustrated example, the fluid conduit 1270 connects the pressure sensor 1260 to the annular air passage 1207, in some embodiments the fluid conduit 1270 can have other configurations. For example, the fluid conduit 1270 can be configured to open into a location within the primary combustion chamber 1206, fluidically connecting the pressure sensor 1260 directly to pressures in the primary combustion chamber 1206. In another example, the fluid conduit 1270 can be configured to open to a location proximal to combustion within an auxiliary combustion chamber of the igniter 1210 (e.g., the auxiliary combustion chamber 602), a location proximal to an outlet of the igniter 1210 (e.g., the outlet 620), or a location proximal a second igniter stage (e.g., the second igniter stage 650).

Figure 13:
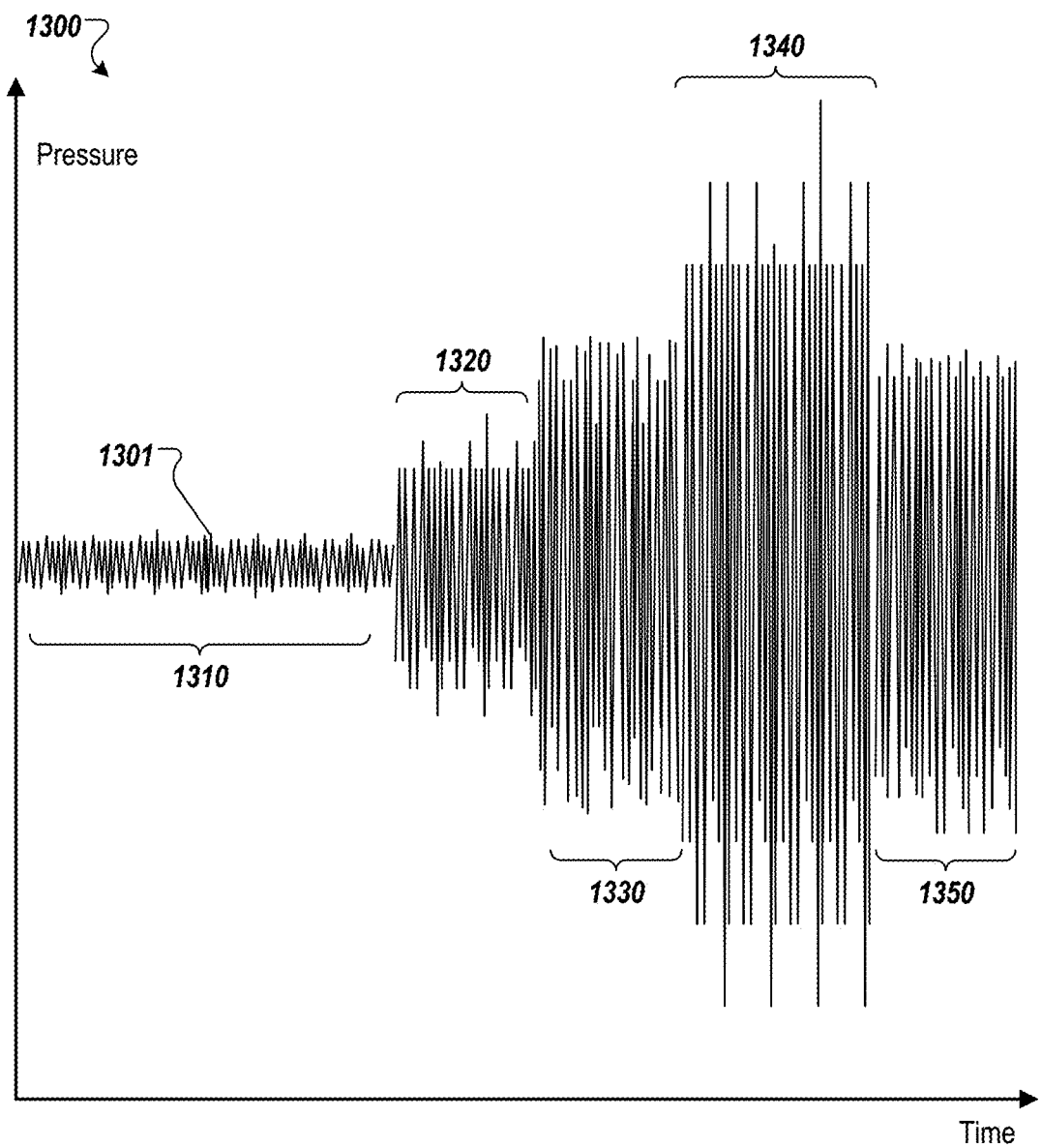
FIG. 13 is a chart of example experimental pressure signals.

FIG. 13 is a chart 1300 of example experimental pressure signals. The chart 1300 shows example pressure fluctuations of a pressure signal 1301 under four operational configurations. The chart 1300 is based on measurements obtained from experimental operation of an igniter system having a pressure feedback system similar to the example feedback-controlled igniter system 1200 of FIGS. 12A and 12B.

During the experiment, the igniter system started in an "off" condition, and there was no combustion in the primary combustion chamber. A section 1310 of the signal 1301 represents the ambient (e.g., background) noise that was measured by the pressure sensor during this initial idle (e.g., pre-start) condition.

During the experiment, the igniter was then ignited. A section 1320 of the signal 1301 represents the pressure fluctuations that were measured by the pressure sensor due to combustion of the igniter alone. As shown in the illustrated example, the amplitude of the pressure signals increased due to the operation of the igniter.

In the next stage of the experiment, an air and fuel mixture was provided to the primary combustion chamber, and was ignited by the torch energy provided by the igniter. A section 1330 of the signal 1301 represents the pressure fluctuations that were measured by the pressure sensor due to combined combustion of the igniter and the primary combustion chamber. As shown in the illustrated example, the amplitude of the pressure signals increased again due to the operation of the igniter and the primary combustion.

Once the primary combustion chamber was ignited, the igniter was shut off, and combustion in the primary combustion chamber continued alone. A section 1340 of the signal 1301 represents the pressure fluctuations that were measured by the pressure sensor due to the combustion occurring in the primary combustion chamber alone. As shown in the illustrated example, the amplitude of the pressure signals increased again after the igniter was turned off.

In another stage of the experiment, the igniter was turned back on again while combustion was already occurring in the primary combustion chamber. A section 1350 of the signal 1301 represents the pressure fluctuations that were measured by the pressure sensor due to combined combustion of the restarted igniter and the primary combustion chamber. As shown in the illustrated example, the amplitude of the pressure signals decreased and returned to levels similar to those observed in the section 1330. These results indicate that pressure fluctuations caused by combustion in the primary combustion chamber can be reduced or otherwise controlled through controlled operation of the igniter.

In some implementations, an igniter may be used to reduce sound emissions from a turbine engine. For example, pressure fluctuations can cause audible sounds, and by controllably operating the igniter, the sound pressure levels produced by the engine can be reduced or otherwise controlled. In some implementations, an igniter may be used to reduce vibration a turbine engine. For example, the igniter can be controllably operated to reduce vibration-inducing pressure fluctuations. By reducing engine vibrations, the lifespan of the engine may be increased. In some implementations, an igniter may be used to improve efficiency of the turbine engine. For example, the igniter may be controllably operated (e.g., throttled, modulated, pulsed) to produce pressure waveforms that promote combustion, or at least partly suppress or offset existing pressure waveforms that can inhibit combustion.

FIGS. 14A and 14B are side and sectional side views of another example feedback-controlled igniter system 1400. In some embodiments, the igniter system 1400 can be the example igniter system 108 of FIG. 1. In some embodiments, the igniter system 1400 can be a modification of the example igniter 200 of FIGS. 2A-2C, the example igniter 300 of FIGS. 3-4, the example igniter 600 of FIGS. 6-7C, or the example igniter system 1200 of FIGS. 12A-12B.

The igniter system 1400 includes a temperature sensor port 1410. Referring now to FIG. 14B, the temperature sensor port 1410 provides access to a tubular temperature sensor conduit 1420 defined within the igniter system 1400. The tubular conduit extends from the temperature sensor port 1410 to an opening 1430 proximal an auxiliary combustion chamber 1440 (e.g., the auxiliary combustion chamber 602).

A temperature sensor 1450 is arranged within the tubular temperature sensor conduit 1420 proximal the opening 1430, and a sensor lead 1460 extends from the temperature sensor 1450 to the temperature sensor port 1410. A controller 1490 (e.g., the example controller 1220 of FIG. 12A) can be configured to receive temperature signals from the temperature sensor 1450.

In use, the temperature sensor 1450 senses the temperature of the auxiliary combustion chamber 1440. When the igniter system 1400 is ignited, the resulting temperature rise can be sensed by the controller 1490 to determine if the igniter 1400 is ignited. In examples in which the controller 1490 determines that the igniter 1400 is ignited (e.g., the sensed temperature exceeds a predetermined threshold temperature), then the controller 1490 may permit a primary engine fuel flow to be provided (e.g., to be ignited by the igniter system 1400). In examples in which the controller 1490 determines that the igniter system 1400 is not ignited (e.g., the sensed temperature is too low), then the controller 1490 may cause the igniter 1400 to be re-ignited.

Figure 15:
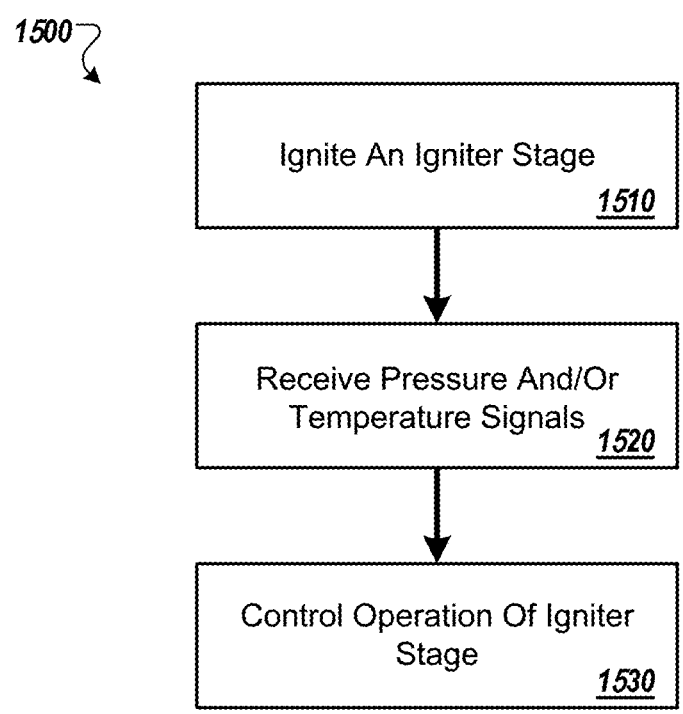
FIG. 15 is a flow diagram of an example process for operating a feedback-controlled igniter system.

FIG. 15 is a flow diagram of an example process 1500 for operating a feedback-controlled igniter system. In some implementations, the process 1500 can be performed by the example feedback-controlled igniter system 1200 of FIGS. 12A and 12B or by the example feedback-controlled igniter system 1400 of FIGS. 14A and 14B.

At 1510 an igniter stage configured to ignite combustion in a turbine combustor assembly is ignited. In some implementations, igniting the igniter state can include receiving fuel into an auxiliary combustion chamber of the igniter stage of the turbine combustor assembly, mixing air incoming into the auxiliary combustion chamber with the fuel to provide a first air and fuel mixture, and igniting the first air and fuel mixture in the auxiliary combustion chamber. For example, the example controller 1220 can control an amount of spark energy and fuel that is provided to the example igniter 1210, and cause the igniter 1210 to ignite.

In some implementations, igniting combustion in a turbine combustor assembly can include igniting a primary air and fuel mixture, in a primary combustion chamber of the turbine combustor assembly, with a combusting air and fuel mixture provided by the igniter stage. For example, the igniter 1210 can ignite air and fuel in the primary combustion chamber 1206 to produce the heated combustion products 1222.

In some implementations, igniting combustion in a turbine combustor assembly can include receiving additional fuel into an auxiliary fuel outlet manifold of a second igniter stage arranged proximal to an outlet of the auxiliary combustion chamber, providing, by the auxiliary fuel outlet manifold, additional igniter fuel to the ignited first air and fuel mixture proximal the outlet, and igniting, by the ignited air and fuel mixture, the additional igniter fuel provided by the auxiliary fuel outlet manifold to provide a combusting air and fuel mixture. For example, the controller 1220 can control a flow of ignition fuel to a an auxiliary fuel outlet, such as the example auxiliary fuel outlet manifold 360 of FIGS. 3-5C or the example auxiliary fuel outlet manifold 660 of FIGS. 6 and 7A.

At 1520, pressure signals are received from a pressure sensor configured to sense pressure in the turbine combustor assembly, and/or temperature signals are received from a temperature sensor configured to sense temperature in the turbine combustor assembly. For example, the controller 1220 can receive pressure sensor signals from the pressure sensor 1260, and/or the controller 1490 can receive temperature sensor signals from the temperature sensor 1450.

At 1530, operation of the igniter stage is controlled based on the received pressure and/or temperature signals. For example, the controller 1220 can control the fuel control valve 1230 to control the amount of fuel provided to the igniter 1210, and/or control the timing and amount of spark energy provided to the igniter 1210 (e.g., to the example ignition source 606 of FIG. 6 or the example ignition source 1006 of FIG. 10). In another example, the controller 1490 can control a fuel control valve (e.g., the fuel control valve 1230) when the temperature suggests that the igniter system 1400 is properly ignited, and/or re-ignite the igniter system 1400 if the temperature suggests that the combustion has been extinguished or failed to ignite.

In some implementations, controlling operation of the igniter stage based on the received pressure signals can include determining, based on the received pressure signals, an absence of combustion in the turbine combustor assembly, and re-igniting the air and fuel mixture in the auxiliary combustion chamber, based on the determining. For example, the igniter 1210 can be used in an attempt to ignite air and fuel in the primary combustion chamber 1206 to produce the heated combustion products 1222. If the ignition is successful, the heated combustion products 1222 can produce pressure signals that are characteristic of primary combustion, and the controller 1220 can determine that primary ignition was successful based on pressure signals received from the pressure sensor 1260.

In some implementations, the absence of combustion in the turbine combustor assembly can be an absence of combustion in a primary combustion chamber of the turbine combustor assembly. For example, if the ignition was not successful, the controller 1220 can determine the failed ignition based on an absence of the characteristic pressure signals. In some implementations, the controller 1220 can respond by re-igniting the igniter 1210 in an attempt to re-ignite the primary combustion. In a similar manner, the controller 1220 can identify that primary combustion has been extinguished (e.g., flame-out) and control the igniter 1210 in an attempt to re-ignite primary combustion.

In some implementations, controlling operation of the igniter stage based on the received temperature signals can include determining, based on the received temperature signals, an absence of combustion in the turbine combustor assembly, and re-igniting the igniter stage, based on the determining. For example, successful ignition can cause combustion will raise the sensed temperature. If no such elevated temperature is detected, then the controller 1490 may determine that there is no combustion occurring and attempt to remedy the situation by re-sparking the igniter system 1400.

In some implementations, the absence of combustion in the turbine combustor assembly can be an absence of combustion in a primary combustion chamber of the turbine combustor assembly. For example, if the ignition was not successful, the controller 1490 can determine the failed ignition based on an absence of the characteristic pressure signals. In some implementations, the controller 1490 can respond by re-igniting the igniter system 1400 in an attempt to re-ignite the primary combustion. In a similar manner, the controller 1490 can identify that primary combustion has been extinguished (e.g., flame-out) and control the igniter system 1400 in an attempt to re-ignite primary combustion.

In some implementations, controlling operation of the igniter stage based on the received pressure and/or temperature signals can include controlling a flow of fuel to the igniter stage based on the received pressure and/or temperature signals. For example, the controller 1220 can dynamically control the fuel control valve 1230, using pressure signals from the pressure sensor 1260 in a closed-loop feedback configuration. In another example, the controller 1490 can dynamically cut fuel flow if the temperature reading can be interpreted as indicating a lack of combustion (e.g., to stop fuel flow if the igniter system 1400 has been extinguished or failed to ignite).

In some implementations, the process 1500 can also include reducing combustion dynamics of combustion in the turbine combustor assembly based on controlling operation of the igniter stage. For example, as shown in the chart 1300, the igniter 1210 can be ignited or otherwise controlled to reduce or otherwise modify the dynamic pressures caused by primary combustion processes.

In some implementations, the process 1500 can also include reducing sound pressure levels of combustion in a primary combustion chamber of the turbine combustor assembly based on controlling operation of the igniter stage. For example, as shown in the chart 1300, the igniter 1210 can be ignited or otherwise controlled to reduce or otherwise modify dynamic pressures that can cause audible emissions (e.g., sound). By modifying the dynamic pressures, the controller 1220 can control the igniter 1210 to reduce or otherwise modify the sounds (e.g., dampen, smooth, shift wavelengths) created by the primary combustion process.

Figure 16:
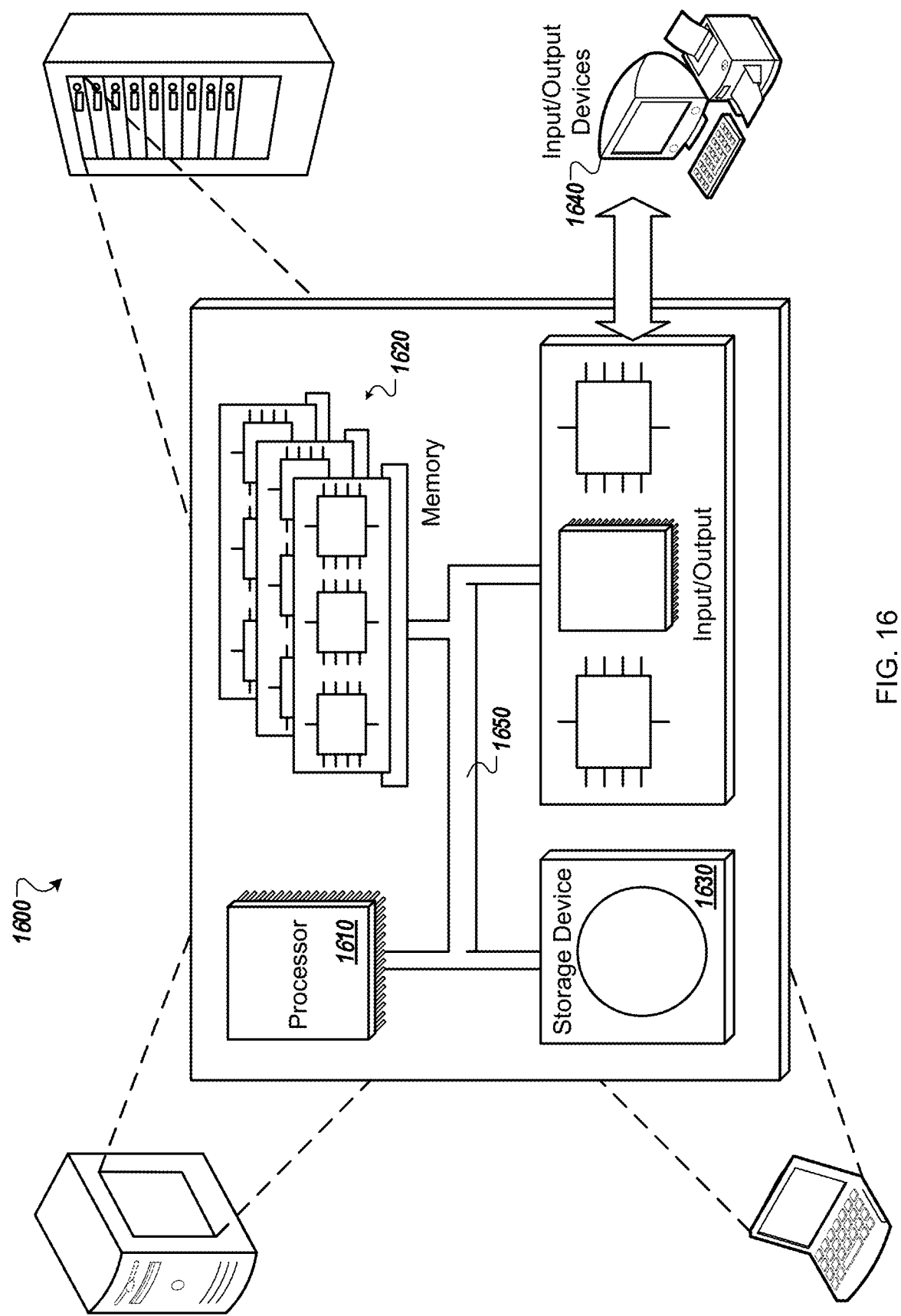
FIG. 16 is a schematic diagram of an example of a generic computer system.

FIG. 16 is a schematic diagram of an example of a generic computer system 1600. The system 1600 can be used for the operations described in association with the process 1400 according to one implementation. For example, the system 1600 may be included in the example controller 1220 of FIG. 2A.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A turbine combustor assembly, comprising:
   a primary combustion chamber in fluid communication with a primary fuel injector and a primary air inlet; and
   an igniter carried by the primary combustion chamber, comprising:
      an igniter stage comprising:
         an auxiliary combustion chamber housing comprising a mixing chamber and a tubular throat converging downstream of the mixing chamber; and
         an ignition source projecting into the mixing chamber of the auxiliary combustion chamber housing;
      a pressure sensor configured to sense pressure within the primary combustion chamber; and
      a controller configured to:
         receive pressure feedback signals, from the pressure sensor, representative of pressure fluctuations due to combustion in the primary combustion chamber;
         identify dynamic pressures due to combustion based on the received pressure feedback signals;
         control an increase of a fuel flow to the igniter during combustion in the primary combustion chamber based on the identification;
         modify the dynamic pressures due to combustion based on the controlled increase of the fuel flow to the igniter during combustion in the primary combustion chamber; and
         reduce audible emissions of combustion in the turbine combustor assembly based on the modification of the dynamic pressures during combustion in the primary combustion chamber.

2. The turbine combustor assembly of claim 1, wherein the tubular throat extends into the primary combustion chamber, and the mixing chamber is arranged within the tubular throat.

3. The turbine combustor assembly of claim 1, further comprising a fluid conduit configured to fluidically connect the pressure sensor to the primary combustion chamber.

4. The turbine combustor assembly of claim 1, wherein the controller is further configured to determine ignition of fuel in the primary combustion chamber based on the received pressure feedback signals.

5. The turbine combustor assembly of claim 1, wherein the controller is further configured to determine an absence of combustion in the primary combustion chamber, and initiate an ignition process during absence of combustion based on the determined absence of combustion.

6. The turbine combustor assembly of claim 1, wherein the ignition source further comprises a spark generating igniter, and the controller is further configured to control spark of the spark generating igniter based on the received pressure feedback signals.

7. A method, comprising:
- igniting an igniter stage;
- igniting, by the ignited igniter stage, combustion in a turbine combustor assembly;
- receiving pressure feedback signals from a pressure sensor configured to sense pressure fluctuations due to the combustion in the turbine combustor assembly;
- identifying dynamic pressures due to combustion based on the received pressure feedback signals;
- controlling operation of the igniter stage by increasing a flow of fuel to the igniter stage during combustion in the primary combustion chamber based on the identification;
- modifying the dynamic pressures due to combustion based on the controlled increase of the flow of fuel to the igniter stage during combustion in the primary combustion chamber; and
- reducing audible emissions of combustion in the turbine combustor assembly based on the modification of the dynamic pressures during combustion in the primary combustion chamber.

8. The method of claim 7, wherein igniting the igniter stage comprises:
- receiving fuel into an auxiliary combustion chamber of the igniter stage of the turbine combustor assembly;
- mixing air incoming into the auxiliary combustion chamber with the fuel to provide a first air and fuel mixture; and
- igniting the first air and fuel mixture in the auxiliary combustion chamber.

9. The method of claim 7, wherein igniting combustion in the turbine combustor assembly comprises igniting a primary air and fuel mixture, in a primary combustion chamber of the turbine combustor assembly, with a combusting air and fuel mixture provided by the igniter stage.

10. The method of claim 7, wherein said controlling operation of the igniter stage during combustion in the primary combustion chamber based on the identification comprises:
- determining, based on the received pressure feedback signals, an absence of the combustion in the turbine combustor assembly; and
- re-igniting the igniter stage, based on the determining.

11. The method of claim 10, wherein the absence of the combustion in the turbine combustor assembly is an absence of combustion in a primary combustion chamber of the turbine combustor assembly.

12. The method of claim 7, further comprising reducing combustion dynamics of combustion in the turbine combustor assembly based on said controlling operation of the igniter stage.

13. The method of claim 7, further comprising reducing sound pressure levels of combustion in a primary combustion chamber of the turbine combustor assembly based on said controlling operation of the igniter stage.

14. The method of claim 7, further comprising controlling spark of a spark generating igniter of the igniter stage based on the received pressure feedback signals.

\* \* \* \* \*